(12) United States Patent
Saeki et al.

(10) Patent No.: US 7,217,223 B2
(45) Date of Patent: May 15, 2007

(54) VEHICLE WITH CLUTCH FOR TRANSMISSION OF TORQUE OUTPUT OF MOTOR

(75) Inventors: Hideyuki Saeki, Kanagawa (JP); Kouichi Shimizu, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 10/237,968

(22) Filed: Sep. 10, 2002

(65) Prior Publication Data
US 2003/0064858 A1 Apr. 3, 2003

(30) Foreign Application Priority Data
Sep. 10, 2001 (JP) ............................. 2001-274123
Nov. 30, 2001 (JP) ............................. 2001-367541

(51) Int. Cl.
*B60W 10/02* (2006.01)
(52) U.S. Cl. ...................... 477/175; 477/166
(58) Field of Classification Search ............ 192/103 F, 192/103 R, 82 T, 84.6; 180/65.2, 242; 477/166, 477/175
See application file for complete search history.

(56) References Cited

U.S. PATENT DOCUMENTS

| | | | |
|---|---|---|---|
| 4,493,228 A * | 1/1985 | Vukovich et al. ........... 477/109 |
| 4,678,069 A | 7/1987 | Yoshimura et al. |
| 4,961,484 A * | 10/1990 | Kato et al. ................ 192/3.31 |
| 5,074,392 A * | 12/1991 | Hasegawa et al. ...... 192/103 R |
| 5,217,097 A * | 6/1993 | Lasoen .................... 192/103 F |
| 5,291,960 A * | 3/1994 | Brandenburg et al. ..... 180/65.2 |
| 5,664,458 A * | 9/1997 | Stasik et al. .............. 74/336 R |
| 6,656,090 B2 * | 12/2003 | Matsumura et al. ........ 477/171 |
| 2001/0003109 A1 | 6/2001 | Tabata |

FOREIGN PATENT DOCUMENTS

| EP | 1 142 743 A2 | 10/2001 |
|---|---|---|
| GB | 2165914 | * 10/1985 |
| JP | 11-243608 A | 9/1999 |
| JP | 2000-318473 A | 11/2000 |
| JP | 2002-160541 A | 6/2002 |
| JP | 2002-171605 A | 6/2002 |

* cited by examiner

*Primary Examiner*—Ha Ho
(74) *Attorney, Agent, or Firm*—Foley & Lardner LLP

(57) ABSTRACT

A vehicle comprises a motor (4) and a wet clutch (12) for transmission of torque output of the motor to road wheels of the vehicle and transmission of road load from the road wheels to the motor (4). The wet clutch is disengaged in response to a clutch disengagement control signal. Accounting for clutch drag state of the wet clutch, a controller (8) selects one out of various values as threshold (Voff). The controller (8) determines that the wet clutch be disengaged when a parameter indicative of the actual vehicle speed has a predetermined relationship with the threshold. The controller (20) generates the clutch disengagement control signal upon determining that the wet clutch be disengaged.

41 Claims, 14 Drawing Sheets

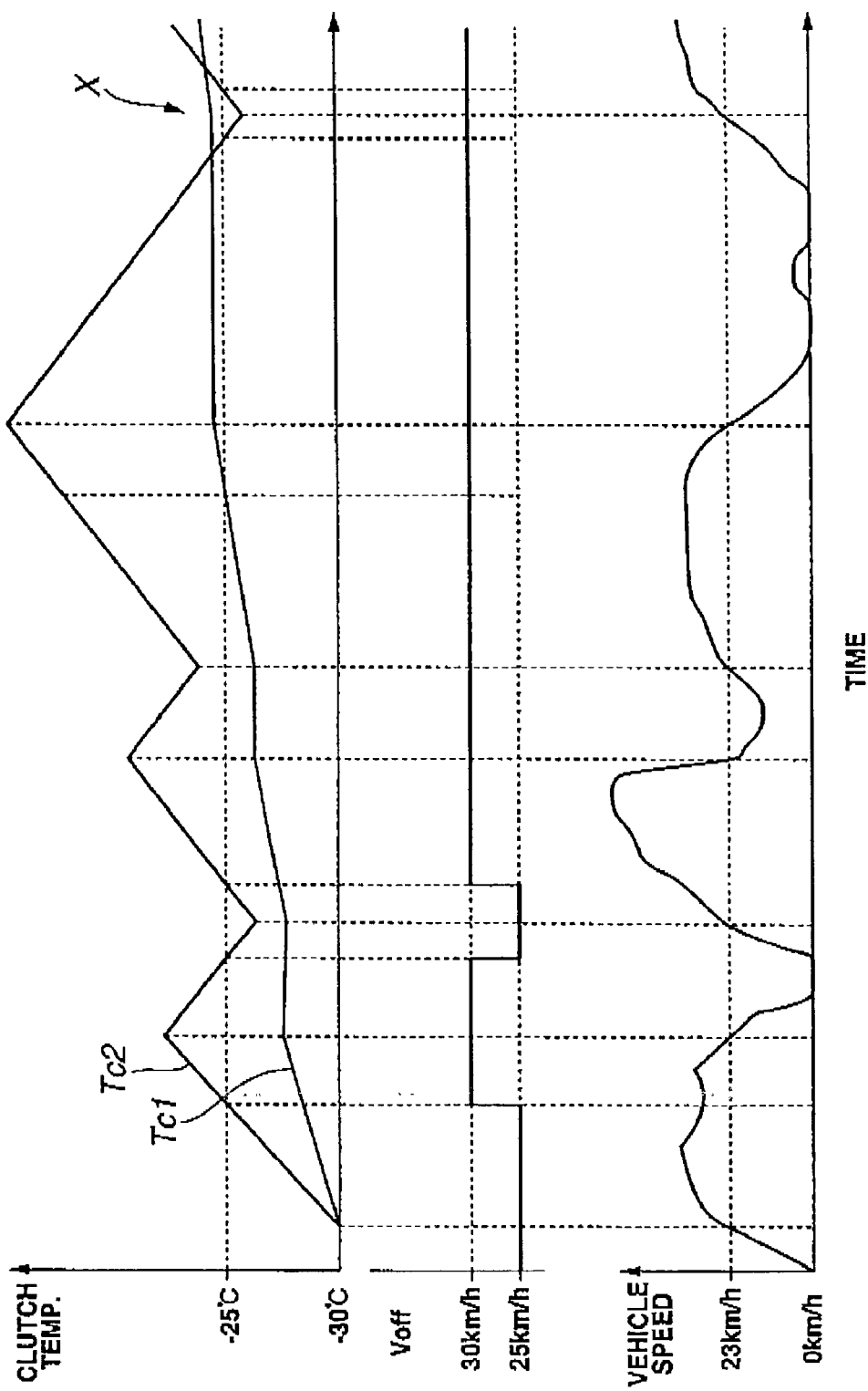

VEHICLE WITH CLUTCH FOR TRANSMISSION OF TORQUE OUTPUT OF MOTOR

BACKGROUND OF THE INVENTION

1. Field of the Invention

The present invention relates to vehicles with a clutch for transmission of torque output of a motor.

2. Description of the Background Art

Vehicles are known which include a prime mover in the form of, such as, an internal combustion engine, drivingly coupled to a first set of road wheels, a motor, and a clutch to engage and disengage the motor to and from road load from another set of road wheels. Publications disclosing such vehicles are Japanese Published Patent Applications (JPPA) Nos. 11-243608 (published Sep. 7, 1999), P2000-318473A (published Nov. 21, 2000), P2002-160541A (published Jun. 4, 2002), and P2002-171605A (published Jun. 14, 2002).

JPPA No. 11-243608 discloses a vehicle with a motor control. According to this control, a dog clutch is engaged to couple a motor to road wheels after motor speed has matched the wheel speed. JPPA No. P2000-318473A discloses a vehicle in which, a generator supplies energy to a motor that is selectively coupled to road wheels by a dog clutch. JPPA No. P2002-1 60541A discloses a vehicle with a motor control According to this control, a hydraulic actuator engages a clutch after motor speed has sufficiently approached to the wheel speed. JPPA No. P2002-171605 discloses a vehicle in which engagement force of a clutch is variably controlled in response to state of charge of an energy storage device when a measure of vehicle speed is not less a preset value. The clutch is completely engaged when the measure of the actual vehicle speed is less than the preset value.

An object of the present invention is to provide a vehicle, which provides extended operating range of a motor as well as providing protection to the motor.

Another object of the present invention is to provide a method for and an apparatus for providing extended operating range of a motor as well as providing protection to the motor.

SUMMARY OF THE INVENTION

In one exemplary implementation of the present invention, a vehicle includes a motor, a wet clutch and a controller. The wet clutch is provided for transmission of torque output of the motor to road wheels of the vehicle and transmission of road load from the road wheels to the motor. The wet clutch is disengaged in response to a clutch disengagement control signal. The controller determines that the wet clutch be disengaged when a parameter indicative of the actual vehicle speed has a predetermined relationship with threshold. The controller generates the clutch disengagement control signal upon determining that the wet clutch be disengaged. Accounting for clutch drag state of the wet clutch, the controller alters the threshold.

In another exemplary implementation of the present invention, there is provided a method for providing extended operating range of a motor of a vehicle as well as providing protection to the motor, the vehicle including a wet clutch for transmission of torque output of the motor to road wheels of the vehicle and transmission of load from the road wheels to the motor, the wet clutch being disengaged in response to a clutch disengagement control signal, the method comprising:

determining that the wet clutch be disengaged when a parameter indicative of the actual vehicle speed has a predetermined relationship with threshold;

generating the clutch disengagement control signal upon determining that the wet clutch be disengaged; and altering, accounting for clutch drag state of the wet clutch, the threshold.

In other exemplary implementation of the present invention, there is provided a method for providing extended operating range of a motor of a vehicle as well as providing protection to the motor, the vehicle including a wet clutch for transmission of torque output of the motor to road wheels of the vehicle and transmission of load from the road wheels to the motor, the wet clutch being disengaged in response to a clutch disengagement control signal, the method comprising:

predicting a local temperature in the proximity of clutch plates of the wet clutch;

determining an overall temperature of the wet clutch;

determining, based on the local temperature and the overall temperature, a clutch operating temperature;

selecting one out of various values as threshold when the clutch operating temperature is higher than or equal to a first predetermined temperature value;

selecting another out of the various values as the threshold when the oil temperature is lower than a second predetermined temperature value;

determining that the wet clutch be disengaged when a parameter indicative of the actual vehicle speed has a predetermined relationship with the threshold; and generating the clutch disengagement control signal upon determining that the wet clutch be disengaged,

BRIEF DESCRIPTION OF THE DRAWINGS

The invention will be apparent from reading of the following description in conjunction with the accompanying drawings.

FIG. 22 is a time chart illustrating operation of the fifth implementation.

DETAILED DESCRIPTION OF THE INVENTION

Figure 1:
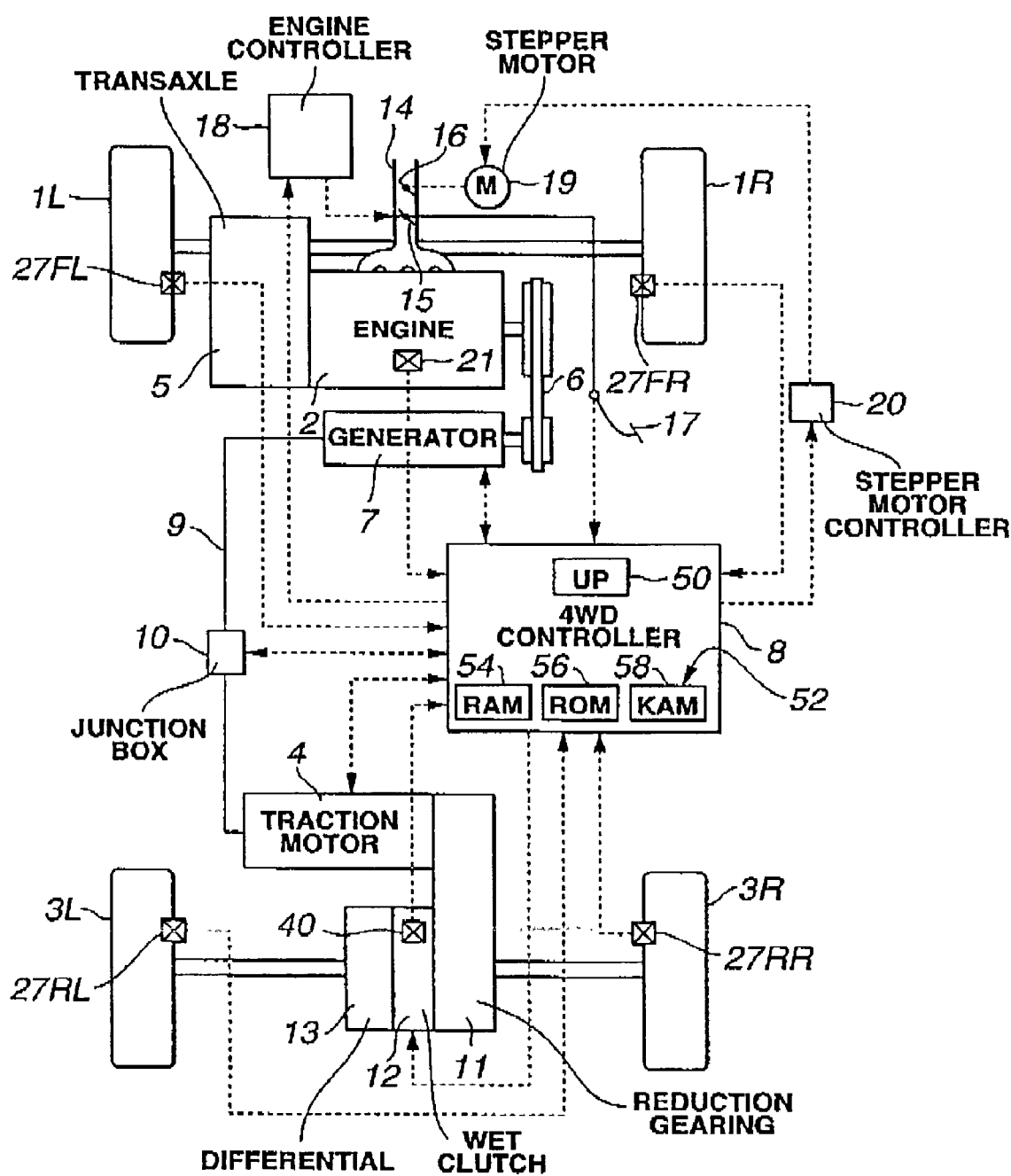
FIG. 1 is a simplified view of a vehicle according to the present invention.

Referring now to the accompanying drawings, FIG. 1 shows a vehicle according to the present invention. The vehicle includes a prime mover 2 in the form of an internal combustion engine. The engine 2 is drivingly coupled to a first set of road wheels 1L and 1R. The vehicle also includes a motor 4, and a wet or hydraulic clutch 12. The wet clutch 12 is provided for transmission of torque output of the motor 4 to a second set of road wheels 3L and 3R and for transmission of road load from the road wheels 3L and 3R to the motor 4. In the illustrated embodiment, the road wheels of the first set are a front left road wheel 1L and a front right road wheel 1R, respectively, and the road wheels of the second set are a rear left road wheel 3L and a rear right road wheel 3R, respectively. The present invention is not limited to this example. The road wheels of the first set may a rear left road wheel and a rear right road wheel, respectively, and the road wheels of the second set may be a front left road wheel and a front right road wheel. In the illustrated embodiment, motor 4 is a traction electric motor. The present invention is not limited to this example. Motor 4 may take the form of a hydraulic motor. In the illustrated embodiment, prime mover 2 is in the form of an internal combustion engine. The present invention is not limited to this example. Prime mover 2 may take the form of another traction electric motor or a set of traction electric motors each coupled to one of the road wheels of the first set. As will be explained below, the vehicle operates in 4WD mode when engagement of the wet clutch 12 transmits torque output of the motor 4 to the second set of road wheels 3L and 3R.

Engine 2 is connected to a transaxle 5 that combines a transmission with a differential between the first set of road wheels 1L and 1R. In operation, transaxle 5 transfers output torque Te of engine 2 to the first set of road wheels 1L and 1R. An endless belt 6 interconnects a pulley of engine 2 and a pulley of a generator 7, causing the generator 7 to rotate at a revolution speed Nh that is expressed as the product of a ratio between the pulleys and the engine speed Ne. With no field current Ifh passing through it, the generator 7 produces no electric power. With field current Ifh, the generator 7 produces electric power.

Figure 2:
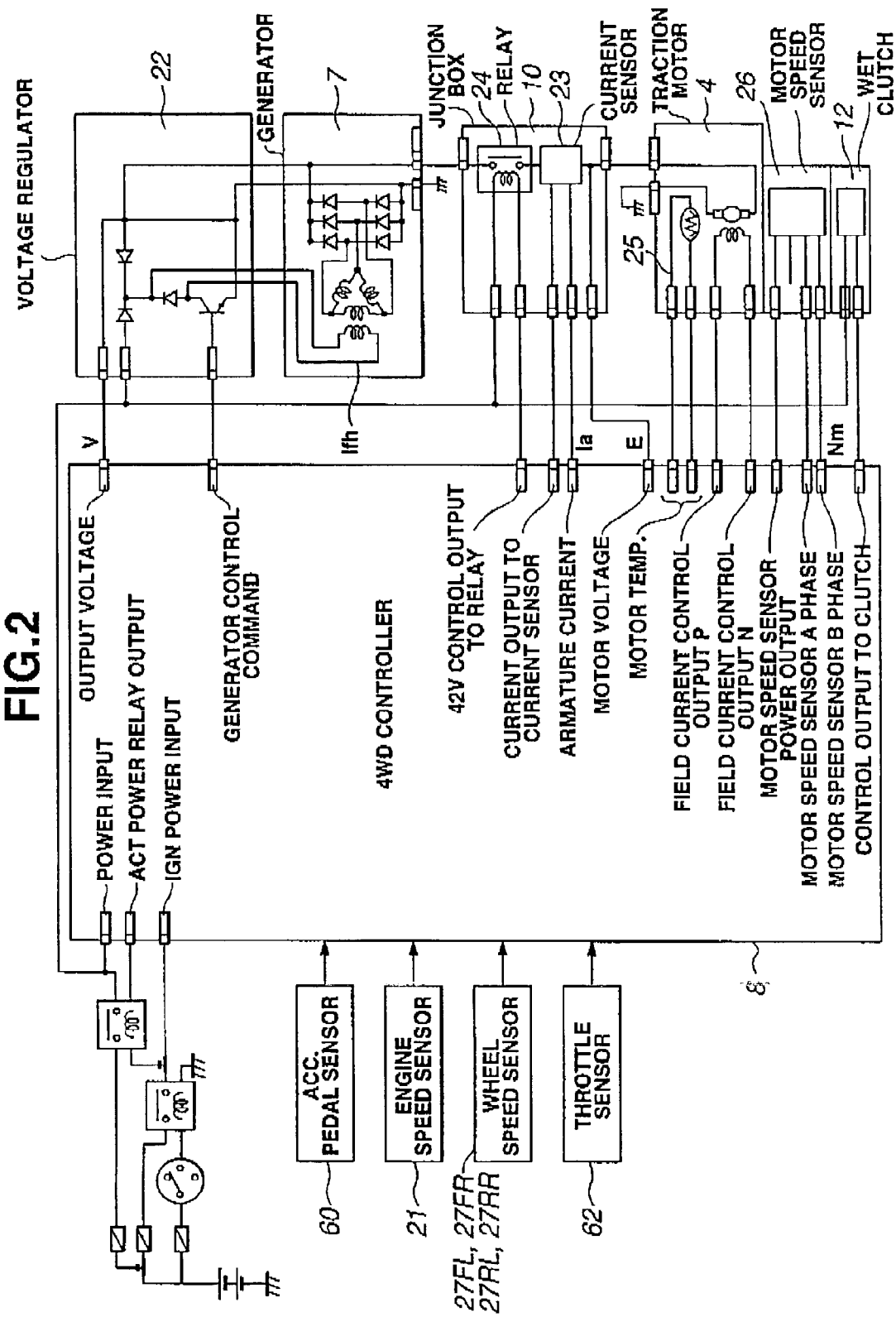
FIG. 2 is a hardware drawing showing the relationship between a 4WD controller and the associated devices.

With reference also to FIG. 2, a microprocessor based 4WD controller 8 regulates field current Ifh passing through the generator 7. The field current Ifh determines load torque, which is applied to the engine 2 when the generator produces electric power. The load torque, in turn, determines voltage of the electric power output of generator 7. Thus, the 4WD controller 8 can regulate the electric power output by regulating field current Ifh.

Via a cable 9, the electric power output of generator 7 is selectively supplied to motor 4. A junction box 10 is positioned in cable 9 between generator 7 and motor 4. Motor 4 is connected to a reduction gearing 11. Wet clutch 12 is positioned between reduction gearing 11 and a differential 13, which is connected to the second set of road wheels 3L and 3R.

The 4WD controller 8 includes a microprocessor 50 in communication with computer-readable storage medium 52. As will be appreciated by those skilled in the art, the computer-readable storage medium 52, for example, may include a random access memory (RAM) 54, a read-only memory (ROM) 56, and/or a keep-alive memory (KAM) 58.

The engine 2 has an air intake system 14, in which a main throttle valve 15 and a sub throttle valve 16 are mounted. In response to the depressed angle of an accelerator pedal 17, the opening angle of main throttle valve 15 is controllably adjusted. In one embodiment, a mechanical linkage interconnects main throttle valve 15 and accelerator pedal 17. In another embodiment, an engine controller 18 receives information as to the depressed angle of accelerator pedal 17 by monitoring an accelerator pedal sensor 60 (see FIG. 2) and controllably adjusts the opening angle of main throttle valve 15. The output of accelerator pedal sensor 60 is fed to 4WD controller 8.

An actuator for sub throttle valve 16 is a stepper motor 18. The number of steps determines an angular position of stepper motor 18, the angular position of which determines the opening angle of sub throttle valve 16. A stepper motor controller 20 determines and controls the number of steps. A throttle sensor 62 (see FIG. 2) feeds the actual opening angle of sub throttle 16 back to controller 20 for use in determining the number of steps. The setting is such that sub throttle valve 16 varies in opening angle to cause a reduction in the torque output of engine 2 determined by the opening angle of main throttle valve 15.

An engine speed sensor 21 generates a signal indicative of the actual engine speed of engine 2. Engine speed sensor 21 feeds the signal to 4WD controller 8.

With continuing reference to FIG. 2, generator 7 is provided with a voltage regulator 22. Voltage regulator 22 regulates voltage V of electric power output of generator 7. Regulating field current Ifh by 4WD controller 8 allows adjustment of load torque Th applied to engine 2 and voltage V of electric power output of generator 7. Voltage regulator 22 receives a generator control command from 4WD controller 8. The generator control command is indicative of a command value of field current Ifh determined at 4WD controller 8. Voltage regulator 22 adjusts the actual value of field current Ifh to the command value. Voltage regulator 22 detects voltage V electric power output of generator 7 and feeds it to 4WD controller 8. Revolution speed Nh of generator 7 can be calculated based on a ratio between revolution speed of a pulley on engine 2 and revolution speed of a pulley on generator 7 and engine speed Ne.

Junction box 10 includes a current sensor 23 and a relay 24. Current sensor 23 is provided to measure electric current of electric power supplied to armature of motor 4 and feeds an armature current Ia indicative signal to 4WD controller 8. Junction box 10 also includes a measuring point connected to motor 4 to measure terminal voltage thereof. 4WD controller 8 has an input port connected to this measuring point and receives the terminal voltage as a motor voltage E. 4WD controller 8 generates a relay command upon determination that supply of electric power to motor 4 be interrupted to deactivate it. In response to the relay command, 4WD controller 8 applies a 42V control output to relay 24, causing the relay to interrupt supply of electric power to motor 4.

4WD controller 8 has four ports connected to motor 4. Among them, two ports are set aside for field current control output P and field current control output N, respectively. Via these two ports, 4WD controller 6 regulates field current Ifm passing through motor 4 to adjust torque output Tm of motor 4. The other two ports are set aside for receiving motor temperature and connected to a temperature sensor of motor 4, in the form of a thermistor 25. Thermistor 25 is provided to measure brush temperature of motor 4.

4WD controller 8 is connected to a motor speed sensor 26. Motor speed sensor 26 is provided to measure a motor speed Nm, i.e., a revolution speed of a driving shaft of motor 4. 4WD controller 8 receives information as to motor speed Nm from the output of the motor speed sensor 26.

4WD controller 8 is connected to wet or hydraulic clutch 12. 4WD controller 8 has a port (control output to clutch) for a clutch command. The clutch command includes a clutch disengagement control signal. In response to the clutch command from 4WD controller 8, wet clutch 12 engages to transmit torque output of motor to road wheels 3L and 3R and to transmit road load from the road wheels 3L and 3R to motor 4. In response to the clutch disengagement control signal, wet clutch 12 disengages to interrupt connection between motor 4 and road wheels 3L and 3R. A temperature sensor 40 (see FIG. 1) is provided to measure a clutch operating temperature within wet clutch 12.

4WD controller 8 is connected to wheel seed sensors 27FL, 27FR, 27RL, and 27RR, which are provided to road wheels 1L, 1R, 3L, and 3R, respectively.

Figure 3:
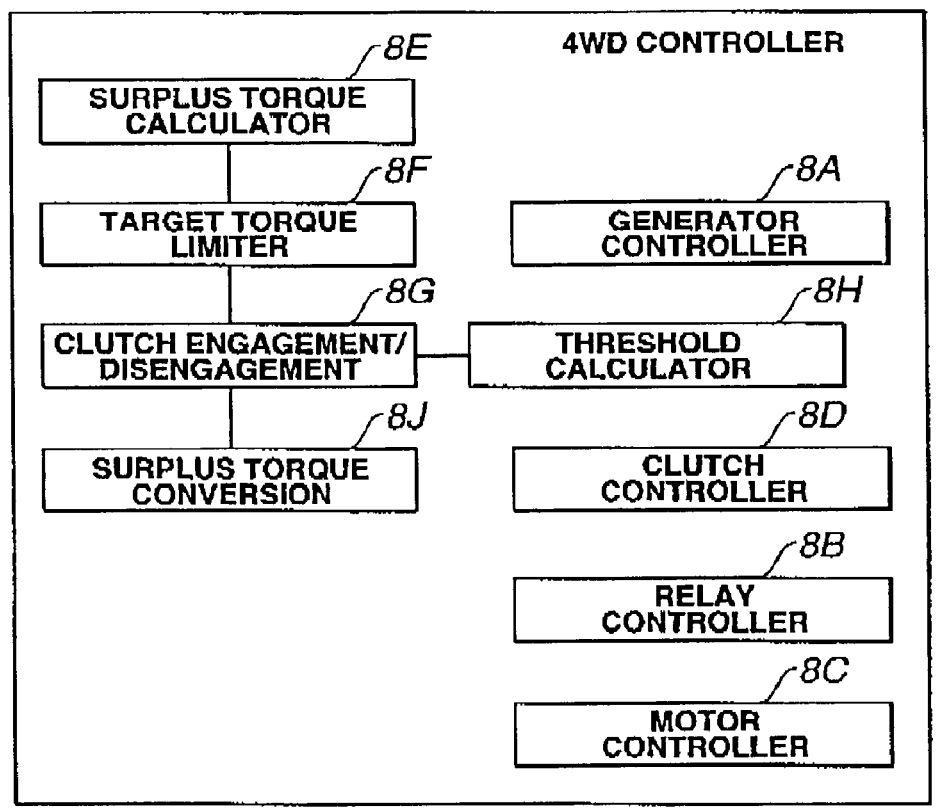
FIG. 3 is a block diagram illustrating control within the 4WD controller

With reference now to FIG. 3, 4WD controller 8 includes a generator controller block 8A, a relay controller block 8B, a motor controller block 8C, a clutch controller block 8D, a surplus torque calculator sub-routine 8E, a target torque limiter sub-routine 8F, a clutch engagement/disengagement sub-routine 8G, a threshold calculator sub-routine 8H, and a surplus torque conversion sub-routine 8I.

At generator controller block 8A, 4WD controller 8 monitors voltage regulator 22 to monitor voltage V of electric power output of generator 7 and regulates field current Ifh of generator 7 to adjust the actual value of voltage V toward any desired value.

At relay controller block 8B, 4WD controller 8 controls relay 24 to activate motor 4 by allowing supply of electric power output of generator 7 to motor 4 or to deactivate motor 4 by interrupting supply of electric power to motor 4.

At motor controller block 8C, 4WD controller 8 regulates field current Ifm passing through motor 4 to adjust the actual value of torque output of motor 4 to any desired value.

At clutch controller block 8D, 4WD controller 8 controls wet clutch 12 by altering timing of disengagement of wet clutch 12.

Figure 4:
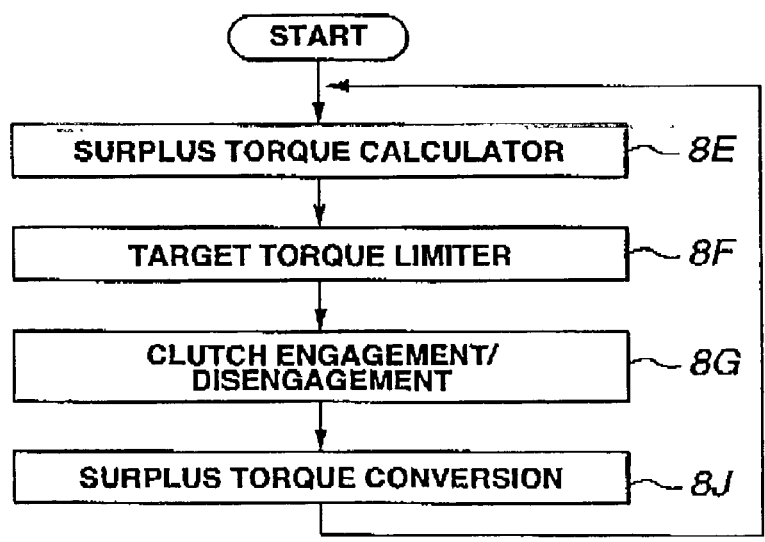
FIG. 4 is a flow diagram illustrating a main control routine of a first exemplary implementation of the present invention.

The flow diagram in FIG. 4 illustrates a main control routine of the first exemplary implementation of the present invention. The control routine is executed at the regular sampling time. At each sampling time, surplus torque calculator sub-routine 8E, target torque limiter sub-routine 8F, clutch engagement/disengagement sub-routine 8G and surplus torque conversion sub-routine 8J are executed in this order.

Figure 5:
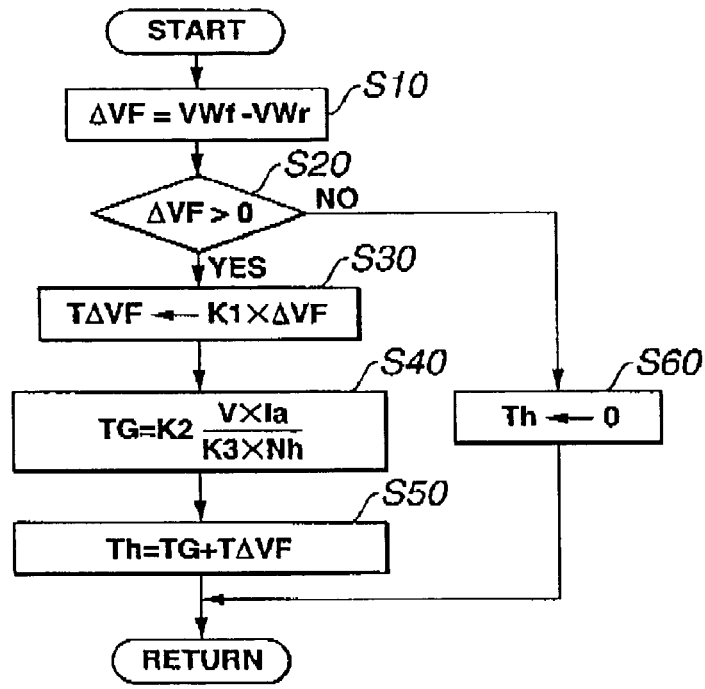
FIG. 5 is a flow diagram illustrating a surplus torque calculator sub-routine.

The flow diagram in FIG. 5 illustrates surplus torque calculator sub-routine 8E.

In FIG. 5, at box S10, the processor 50 calculates a slip speed $\Delta VF$, which is expressed as;

$$\Delta VF = VWf - VWr \qquad \text{Eq. 1}$$

where:

$$VWf = (VWfl + VWfr)/2;$$

$$VWr = (VWrl + VWrr)/2;$$

VWfl: Wheel speed of road wheel 1L;
VWfr: Wheel speed of road wheel 1R;
VWrl: Wheel speed of road wheel 3L;
VWrr: Wheel speed of road wheel 3R.

At the next enquiry box S20, the processor determines whether or not the slip speed $\Delta VF$ is greater than 0 (zero). If this is the case, the road wheels 1L and 1R are subject to acceleration slip and the control logic goes to box S30.

At box S30, the processor calculates torque $T\Delta VF$, which is expressed as:

$$T\Delta VF = K1 \times \Delta VF \qquad \text{Eq. 2}$$

where:
$T\Delta VF$: Torque by which the torque output of engine 2 needs to be reduced to eliminate slip occurring at road wheels 1L and 1R;
K1: Gain determined by simulation or field test.

At the next box S40, the processor calculates current load torque TG applied to engine 2 by generator 7. Load torque is expressed as:

$$TG = K2 \frac{V \times Ia}{K3 \times Nh} \qquad \text{Eq. 3}$$

where:
V: Voltage of generator 7;
Ia: Armature current of generator 7;
Nh: Revolution speed of generator 7;
K3: Efficiency;
K2: Coefficient.

At the next box S50, the processor calculates surplus or desired load torque Th, to which generator 7 can load engine 2. The desired load torque Th is expressed as:

$$Th = TG + T\Delta VF \qquad \text{Eq. 4}$$

Returning to box S20, if the processor determines that $\Delta VF$ is zero or less, the control logic goes to box S60. At box S60, the processor sets the desired load torque Th equal to 0 (zero).

Figure 6:
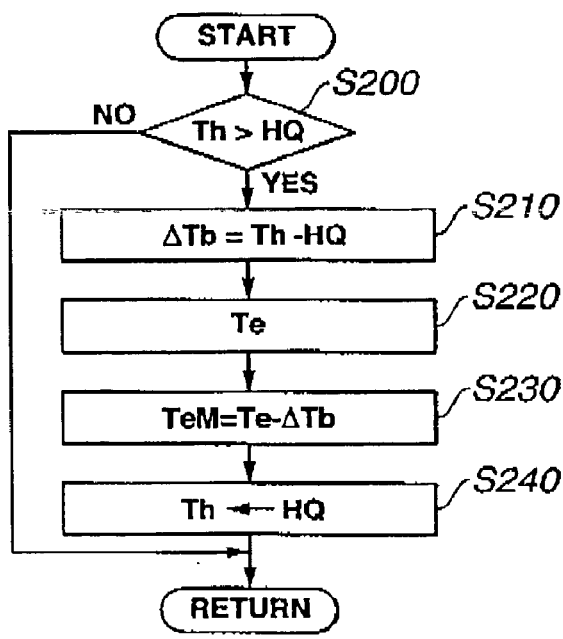
FIG. 6 is a flow diagram illustrating a target torque limiter sub-routine.

The flow diagram in FIG. 6 illustrates target torque limiter sub-routine 8F.

In FIG. 6, at enquiry box S200, the processor determine whether or not the desired load torque Th is greater than the maximum loading capability HQ of generator 7. If Th is equal to or less than HQ, the control logic returns to the main routine in FIG. 4. If Th is greater than HQ, the control logic goes to box S210.

At box S210, the processor calculates an excess load torque ΔTb over HQ, which is expressed as:

$$\Delta Tb = Th - HQ \qquad \text{Eq. 5}$$

At the next box S220, the processor calculates current torque output Te of engine 2 (engine torque) based on information on engine revolution speed from engine speed sensor 21 and information on the opening angle of throttle valve from throttle sensor 62 (see FIG. 2).

At box S230, the processor calculates an engine torque upper limit TeM, which is expressed:

$$TeM = Te - \Delta Tb \qquad \text{Eq. 6}$$

At the same box S230, the processor feeds engine torque upper limit TeM to engine controller 18 (see FIG. 1). Upon or immediately after receiving TeM, engine controller 18 sets TeM as an upper limit of torque output Te of engine 2.

At the next box S240, the processor sets load torque Th equal to HQ. After this box, the control logic returns to the main routine in FIG. 4.

Figure 7:
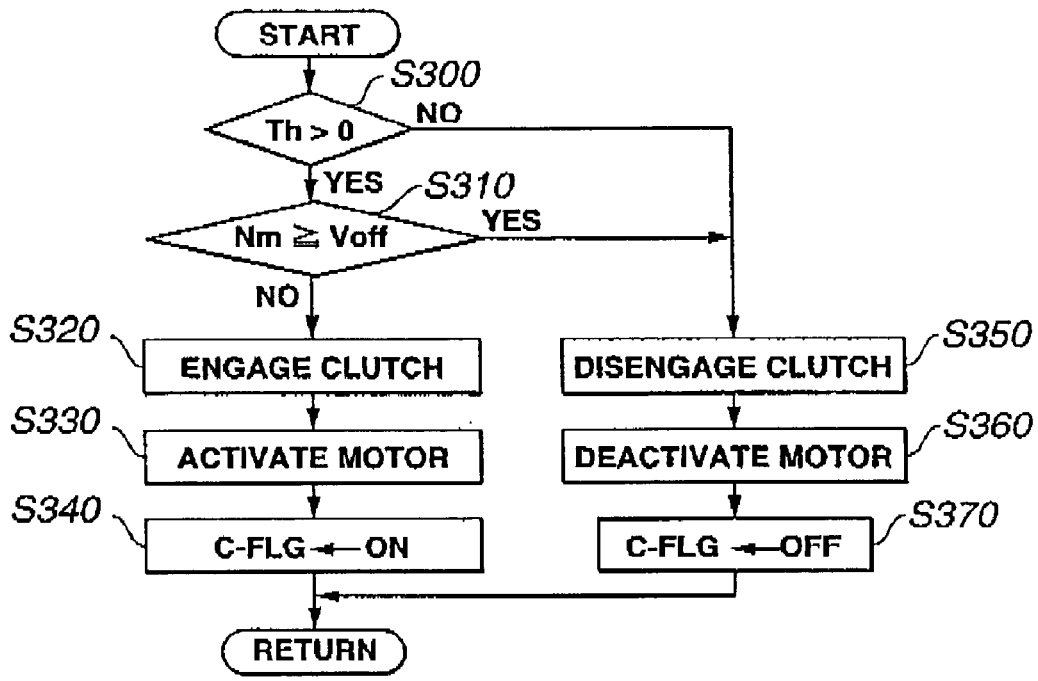
FIG. 7 is a flow diagram illustrating a clutch engagement/disengagement sub-routine.

The flow diagram in FIG. 7 illustrates a clutch engagement/disengagement sub-routine 8G.

In FIG. 7, at enquiry box S300, the processor determines whether or not the desired load torque Th is greater than 0 (zero). When Th is greater than 0, road wheels 1L and 1R are slipping, thus satisfying condition for traveling in 4WD mode. In this case, the control logic goes to box S310. When Th is equal to or less than 0, road wheels 1L and 1R are not slipping, satisfying condition for traveling in 2WD mode. In this case, the control logic goes to box S350.

At box S310, the processor determines whether or not a predetermined condition is satisfied to disengage wet clutch 12. If the predetermined condition is satisfied, the control logic goes to box S350. If this condition is not satisfied, the control logic goes to a box S320. At box S310, the processor determines whether or not motor revolution speed Nm is equal to or greater than threshold Voff. The processor determines that the condition to disengage clutch 12 is satisfied when motor speed Nm is equal to or greater than threshold Voff. When motor speed Nm is less than threshold Voff, the processor determines that the condition is not satisfied.

In the implementation, the threshold Voff is not given by values in the vehicle speed. The threshold Voff is given by values in motor speed because the motor speed value may be used to predict the vehicle speed value, and it is compared to the actual value in motor speed Nm. Of course, the actual value of vehicle speed may be compared to the threshold Voff expressed in terms of a vehicle speed value.

At box S320, the processor outputs a clutch command to clutch controller block 8D to engage clutch 12. At the next box S330, the processor outputs a relay ON command to relay controller block 8B to activate motor 4. After establishing 4WD in this manner, the processor sets a flag C-FLG equal to ON level at box S340 before returning to the main routine in FIG. 4.

At box S350, the processor outputs a clutch disengagement control signal to clutch controller block 8D to disengage clutch 12. At the next box S360, the processor outputs a relay OFF command to relay controller block 8B to deactivate motor 4. After box S360, the processor sets flag C-FLG equal to OFF level at box S370 before returning to the main routine in FIG. 4.

Figure 8:
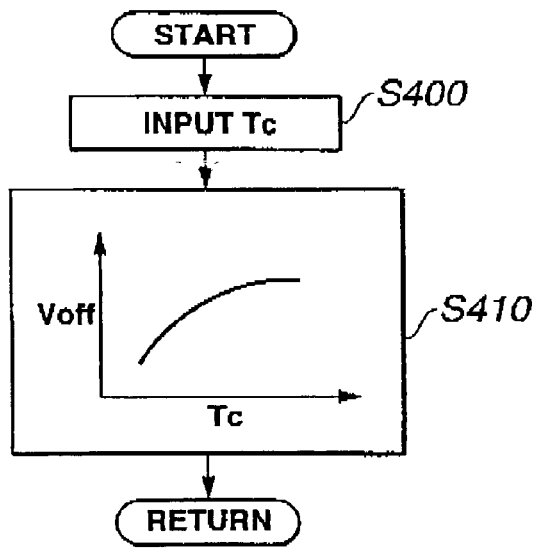
FIG. 8 is a flow diagram illustrating a threshold calculator sub-routine.

The flow diagram in FIG. 8 illustrates a threshold calculator sub-routine.

In FIG. 8, at box S400, the processor monitors temperature sensor 40 to monitor a clutch operating temperature Tc, which is oil temperature within clutch 12 in the first implementation. At the next box S410, the processor looks into a look-up map or function and selects one out of various speed values as threshold Voff against the clutch operating temperature Tc determined at box S400.

Figure 13:
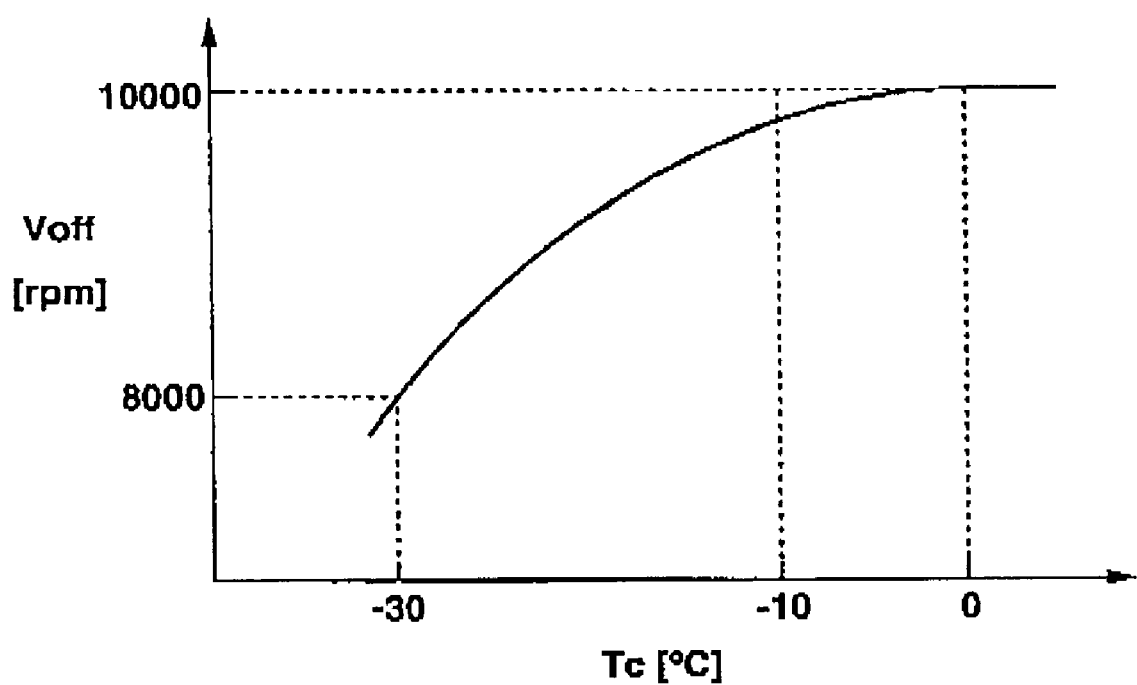
FIG. 13 is a threshold map.

With reference to FIGS. 9, 10, 11, 12 and 13, the following three sections provide a description on the relationship between disengagement characteristic of wet clutch 12 and clutch operating (oil) temperature Tc and a description on how a threshold look-up map illustrated within box S410 in FIG. 8 is created. FIG. 13 illustrates in detail the threshold map.

Figure 9:
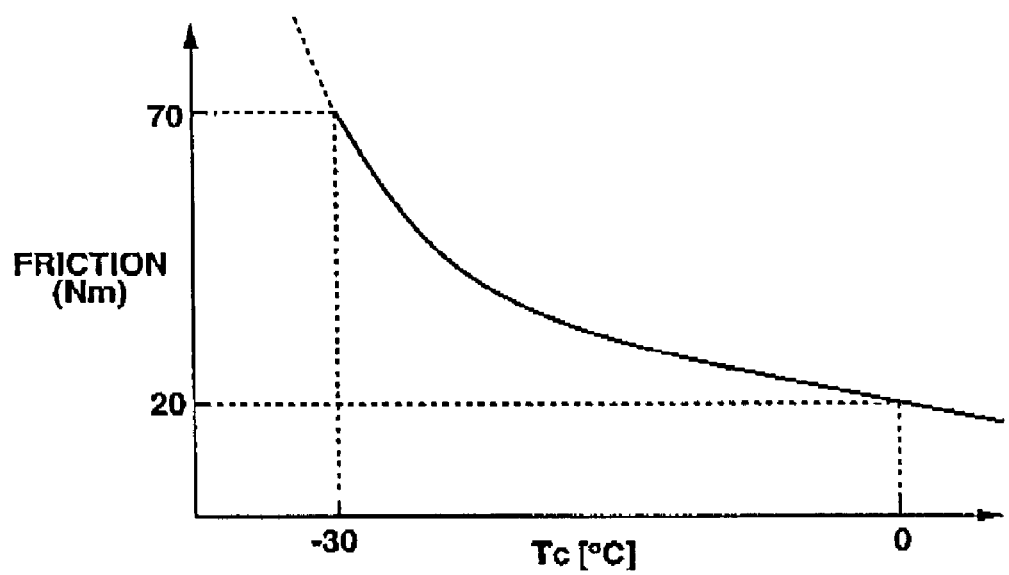
FIG. 9 is a characteristic curve illustrating the relationship between friction and clutch operating temperature Tc (clutch oil temperature).
Figure 10:
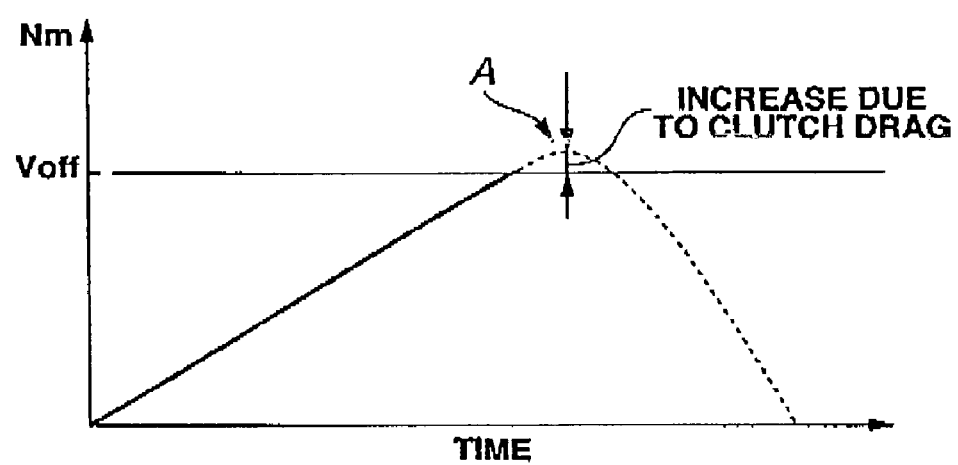
FIG. 10 illustrates varying of motor revolution speed with respect to time upon and immediately after disengagement of a clutch.
Figure 11:
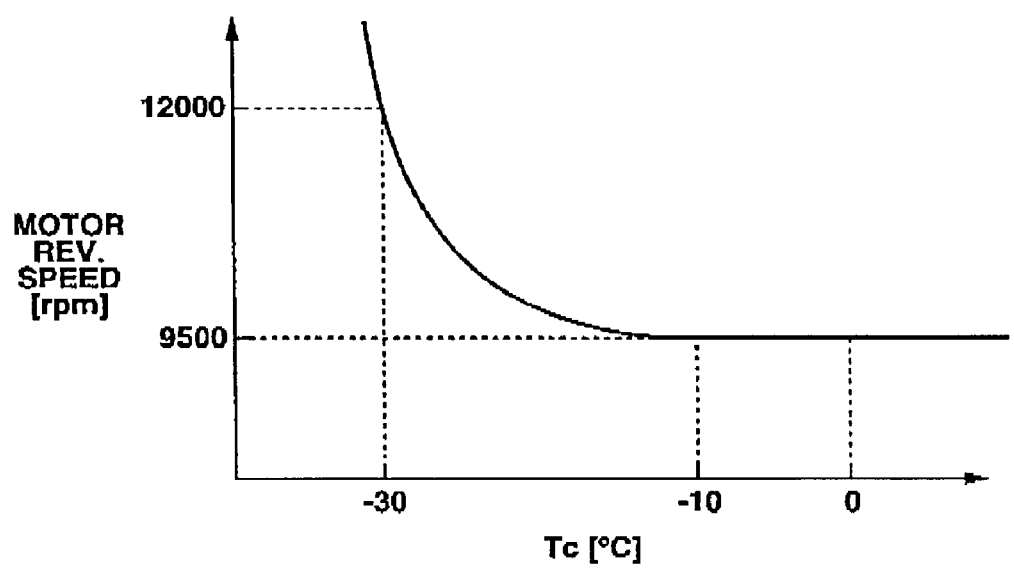
FIG. 11 illustrates the relationship between a peak in motor revolution speed immediately after disengagement of the clutch at motor speed of 8,000 rpm and clutch operating temperature.
Figure 12:
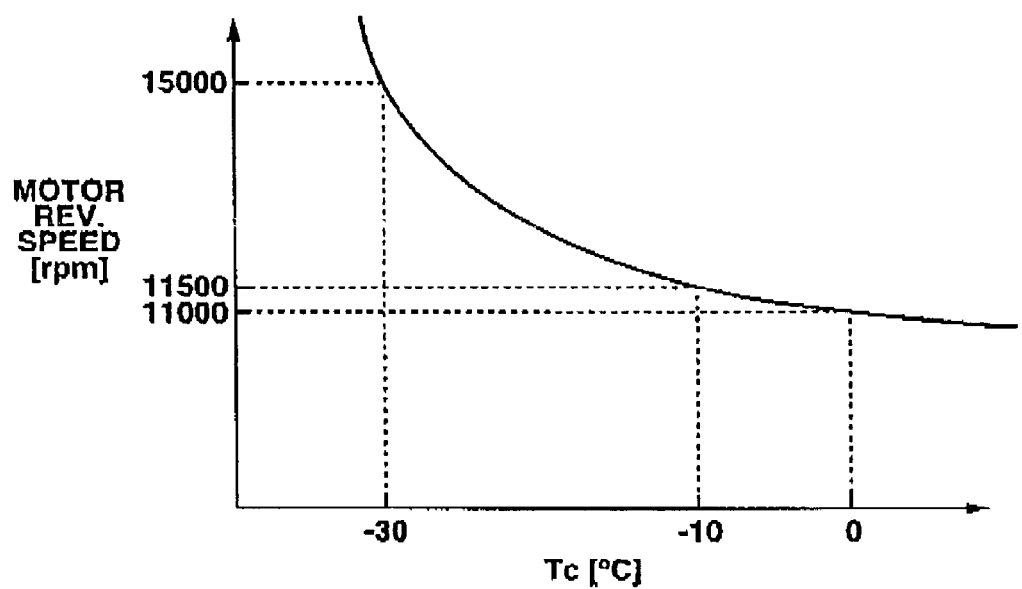
FIG. 12 illustrates the relationship between a peak in motor revolution speed immediately after disengagement of the clutch at motor speed of 12,000 rpm and clutch operating temperature.

The disengagement characteristic of wet clutch 12 depends largely on temperature characteristic of clutch oil. The lower the clutch oil temperature, the more clutch drag appears vividly upon disengagement of wet clutch 12. An increase in viscosity due to a drop in temperature causes an increase in friction between the adjacent two clutch plates. FIG. 9 illustrates varying of friction between clutch plates of wet clutch 12 with different clutch oil temperature values in the range of −30° C. and 0° C. FIG. 10 illustrates a typical varying of motor speed Nm immediately after disengagement of wet clutch 12, which possesses the illustrated characteristic in FIG. 9, at a motor speed as high as threshold Voff when supply of current to motor 4 is interrupted to deactivate the motor. Usually, the vehicle is being accelerated when 4WD mode is selected. The motor speed Nm increases linearly as indicated by the fully drawn line. Upon and immediately after disengagement of motor 4 from the road load by wet clutch 12, the motor speed Nm continues to increase to a peak as indicated by the reference character A and the dotted curve. After hitting the peak, the motor speed Nm drops.

Using wet clutch 12, motor 4 was disengaged from the road load at a revolution speed of 8,000 rpm. Motor speed value was measured at peak immediately after the clutch disengagement. Such tests were conducted at different temperatures within a range including temperatures of −30° C. and 0° C. The result is illustrated by the fully drawn curve in FIG. 11. The revolution speed threshold was increased to 12,000 rpm. Similarly, motor speed value was measured at peak immediately after the clutch disengagement. Such tests were conducted at different temperatures within a range including temperatures of −30° C. and 0° C. The result is illustrated by the fully drawn curve in FIG. 12.

In the implementation, the maximum speed that is permitted and assured by the manufacturer for steady state operation of motor 4 is 12,000 rpm. At each of different temperature values, an appropriate revolution speed value was found, as threshold Voff, which causes the motor revolution speed to hit the peak at 12,000 rpm immediately after clutch disengagement. The fully drawn line in FIG. 13 illustrates the result. In the implementation, a threshold look-up map illustrated by the fully drawn curve in FIG. 13 is used at box S410 in FIG. 8.

Figure 14:
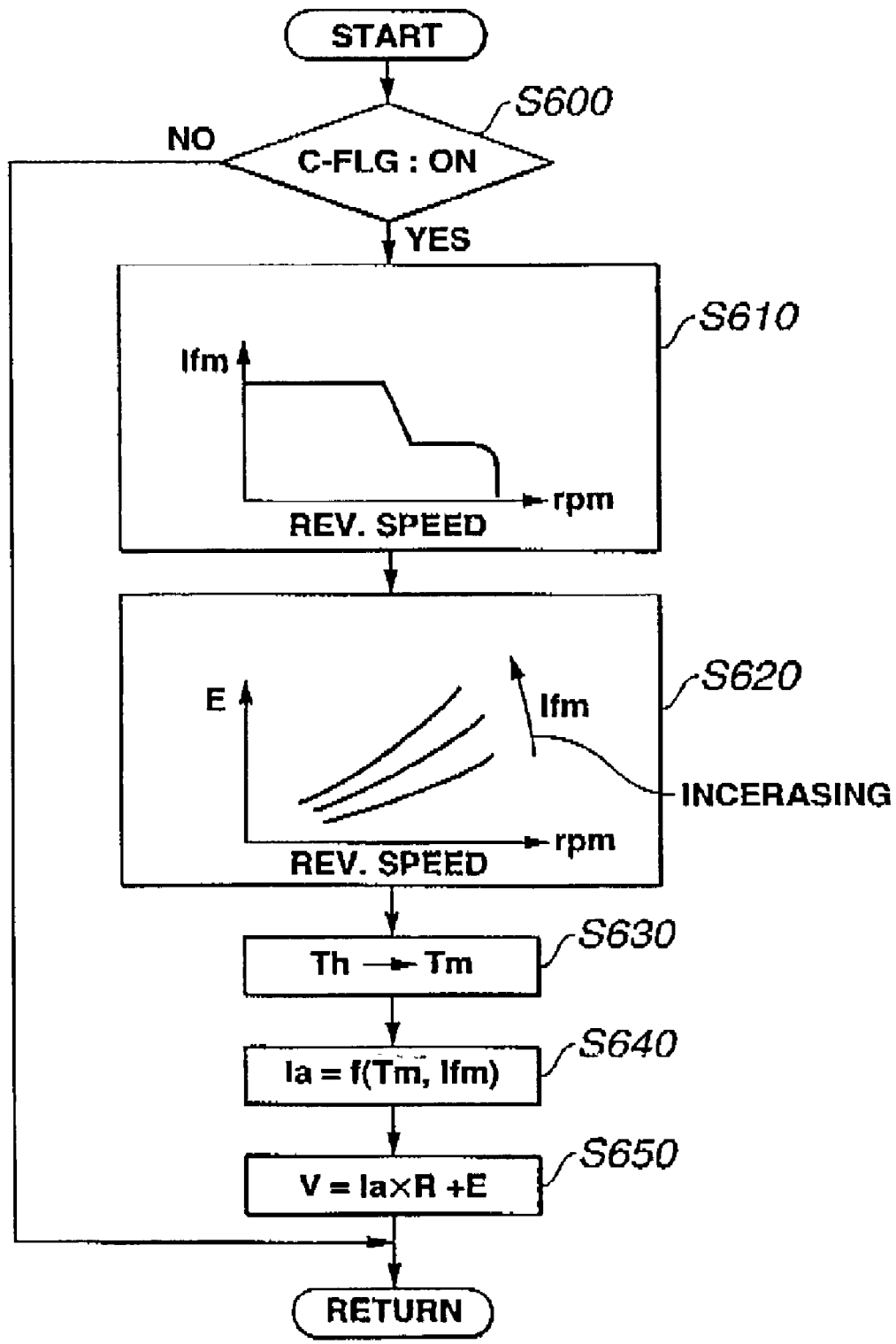
FIG. 14 is a flow diagram illustrating a surplus torque conversion sub-routine.

The flow diagram in FIG. 14 illustrates a surplus torque conversion sub-routine 8J.

In FIG. 14, at box S600, the processor determines whether or not flag C-FLG is at ON level. If C-GLG is at ON level, the control logic goes to box S610 because the condition for 4WD mode has been satisfied. If C-GLG is at OFF level, the control logic returns to the main routine in FIG. 4 because, as readily seen from the flow diagram in FIG. 7, the condition for 4WD mode has not been satisfied or the motor speed Nm has exceeded threshold Voff.

At box S610, the processor inputs information on motor speed Nm from the output of motor speed sensor 26 (see FIG. 2). At the same box S610, the processor determines a desired value in field current Ifm of motor 4 by using, for example, the illustrated relation between Ifm and motor speed Nm within box S610. The processor outputs this determined desired motor field current Ifm to motor controller block 8C (see FIG. 3).

This section provides a description on unique two-level scheduling of motor field current Ifm against different motor speeds Nm. As illustrated by the fully drawn line in box S610 of the flow diagram in FIG. 14, motor field current Ifm is kept at a first level when motor 4 operates at motor speeds lower than a predetermined speed. When this predetermined speed is exceeded, motor field current Ifm drops to a second level. This drop in motor field current Ifm provides a good solution to insufficient torque output of motor 4 at high motor speeds. At high motor speeds, voltage E elevates. This elevation obviates flow of current needed, in amount, for motor 4 to produce sufficiently high torque output desired at high motor speeds. The above mentioned drop in motor field current Ifm suppresses the elevation of voltage E at high motor speeds, holding it low enough to ensure flow of current needed, in amount, for motor 4 to produce sufficiently high torque output desired at high motor speeds.

With a simple, less complicated and less expensive controller, the above-mentioned two-level scheduling of motor field current Imf can be realized.

The two-level scheduling of motor field current Ifm may be improved by employing continuous correction technique of motor torque. According to this correction technique, to accomplish a desired value in motor torque Tm, field current Ifm is regulated to a value that is determined against the desired value in motor torque Tm and a current value in motor speed Nm. Regulating motor field current Ifm to a value determined by a current value in motor speed Nm during transient period of the two-level scheduling is encouraged. Such regulating of motor field current Ifm suppresses elevation of voltage E and reduction in motor torque at high motor speeds, accomplishing a desired value in motor torque Tm. Besides, employing this correction technique provides smooth motor torque characteristic, enhancing stability in vehicle running, keeping motor always operating at good driving efficiency.

With continuing reference to FIG. 14, after determining, at box S610, a desired value of motor field current Ifm against a current value of revolution speed Nm, the control logic goes to box S620. At box S620, the processor determines a value of voltage E of motor 4 based on the desired value of motor field current Ifm and the current value of motor speed Nm by referring to the illustrated relationship.

At the next box S630, the processor sets a desired value of motor torque Tm equal to the desired load torque Th that has been determined at surplus torque calculator sub-routine 8E (see FIG. 5) and processed at target torque limiter sub-routine 8F (see FIG. 6).

At the next box S640, the processor determines a desired value of armature current Ia as a function of the desired value of motor torque Tm and the desired value of motor field current Ifm. Then, the control logic goes to box S650.

At box S650, the processor determines a desired value of voltage V of generator 7, which is expressed as:

$$V = Ia \times R + E \qquad \text{Eq. 7}$$

where:
  V: Voltage of electric power output of generator 7;
  Ia Armature current of motor 4;
  R: Resistance of cable 9 and resistance of coil of motor 4;
  E: Voltage of motor 4.

The processor outputs the desired value of voltage V to generator controller 8A (see FIG. 3).

In the illustrated flow diagram in FIG. 14 of surplus torque conversion sub-routine 8J, the desired voltage V is determined for the desired load torque Th accounting for regulation on the motor 4 side. The desired voltage V may be directly determined by the desired load torque Th.

From the preceding description on the first implementation, it is now appreciated that the processor monitors temperature sensor 40 to monitor the clutch operating temperature Tc to account for clutch drag state of wet clutch 12. As explained before with reference to FIG. 8, accounting for the clutch drag state indicated by the monitored clutch operating temperature Tc, the processor selects one out of various values of motor revolution speed Nm as threshold Voff. With reference back to FIG. 7, the processor determines that wet clutch 12 be disengaged when the motor speed Nm, which is a parameter indicative of the actual vehicle speed, is equal to or higher than the threshold Voff, and generates a clutch disengagement control signal. The clutch disengagement control signal is applied to clutch controller 8D (see FIG. 3).

Further description on the first implementation is as follows:

When the road wheels 1L and 1R are subject to acceleration slip $\Delta$VF, the generator 7 generates electric power in response to load torque Th that is expressed by the equation 4 (Th=TG+T$\Delta$VF), causing a reduction in driving torque applied to the road wheels 1L and 1R, thus suppressing acceleration slip $\Delta$VF.

In addition to the suppressing of acceleration slip $\Delta$VF, the electric power from the generator 7 drives motor 4 that is engaged by wet clutch 12 to road wheels 3L and 3R. The motor 4 drives the road wheels 3L and 3R, moving the vehicle in 4WD mode, providing enhanced acceleration performance.

Under this condition, a surplus portion by which engine torque exceeds the road reaction limit torque of the road wheels 1L and 1R is used to drive the motor 4, providing enhanced energy efficiency, leading to enhanced fuel economy.

Besides, this part time 4WD according to the first implementation is advantageous over the full time 4WD in energy efficiency and accelerations-performance because the surplus engine torque is used to move the vehicle in 4WD and, if there is no such surplus engine torque, all of the engine torque is used to move the vehicle in 2WD mode. Operating the vehicle in 4WD mode is accompanied by a loss in energy upon conversion from kinetic energy to electric energy and a loss in energy from the electric energy to kinetic energy. This is inferior in acceleration performance to operating the vehicle in 2WD mode. Accordingly, the full time 4WD is discouraged in the case an engine driven generator is used to drive a traction motor engaged to road wheels 3L and 3R.

According to the first implementation, one out of various values is selected accounting for clutch drag state of the wet clutch 12 and the selected one is set as threshold Voff. Disengaging the wet clutch 12 accounting for the clutch drag state allows operation of the motor 4 in 4WD mode over extended range in addition to providing protection to the motor 4.

In the preceding description on the first implementation, electric power output of generator 7 drives motor 4. The present invention is not limited to this. For example, a battery bank may be provided as a source of such electric power. In this case, electric power from the generator 7 may be used to drive other load.

In the preceding description, the throttle control is employed in limiting the torque output of the engine 2. The present invention is not limited to this. Retarding ignition timing or suspending ignition or suspending/reducing fuel supply may limit the engine torque output.

Figure 15:
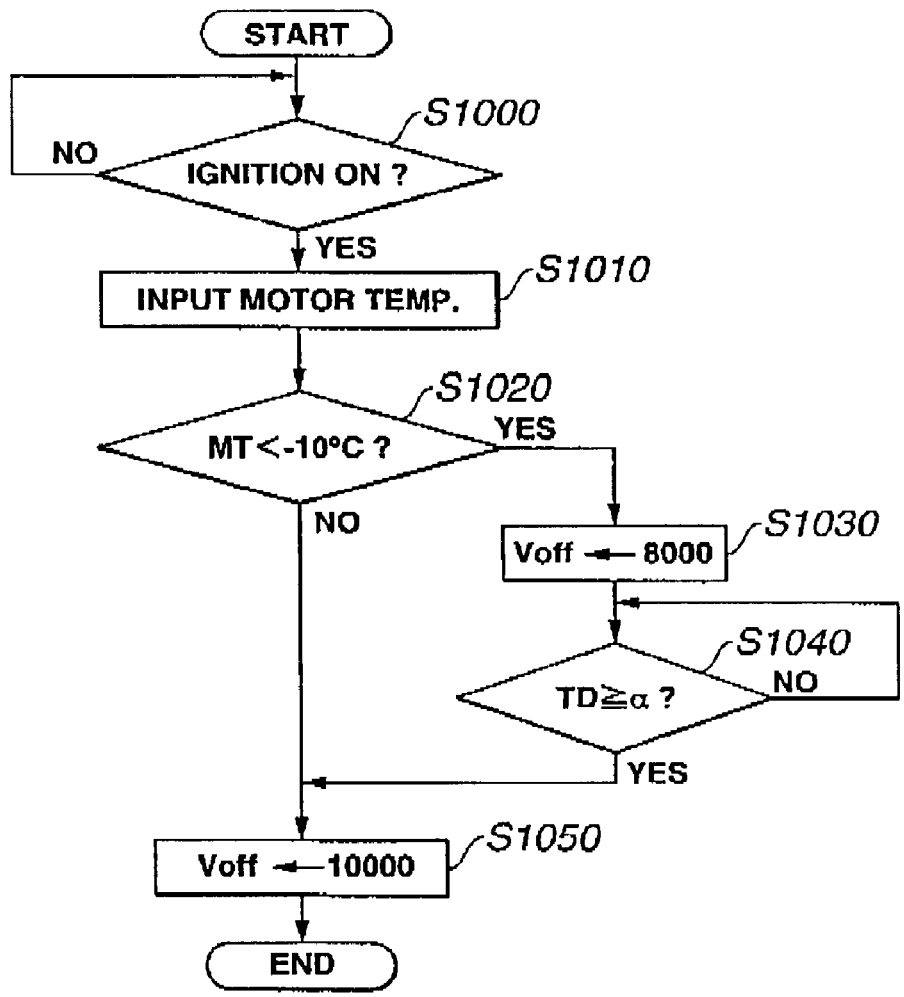
FIG. 15 is a flow diagram illustrating a threshold calculator sub-routine according to a second exemplary implementation of the present invention.
Figure 16:
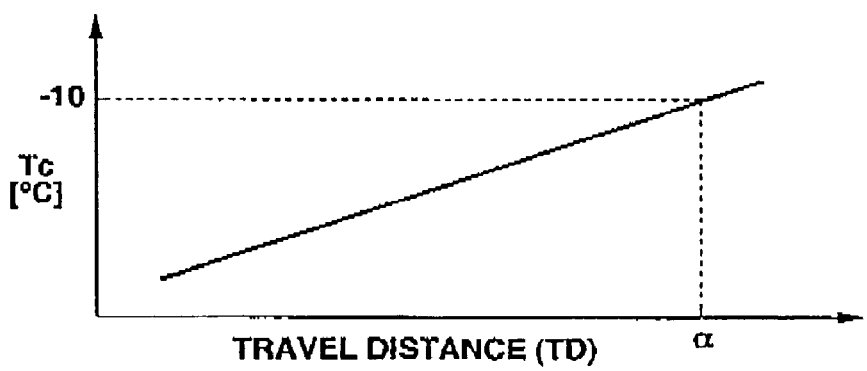
FIG. 16 illustrates the relationship between clutch operating temperature and travel distance (TD).

With reference now to FIGS. 15 and 16, there is provided a description on the second exemplary implementation of the present invention.

The second implementation is substantially the same as the first implementation except the content of a threshold calculator sub-routine 8H. Like reference numerals and characters are used to designate like parts or portions throughout FIGS. 1 to 16 for brevity of description of the second implementation.

The flow diagram in FIG. 15 illustrates the threshold calculator sub-routine 8H according to the second implementation of the present invention.

In FIG. 15, at box S1000, the control logic waits until the ignition is turned on or the engine 2 starts. Upon or after the engine startup, the control logic goes to box S1010.

At box S1010, the processor monitors a temperature sensor in the form of thermistor 25 to input motor temperature (MT).

At the next box S1020, the processor determines whether or not the MT (motor temperature) is lower than −10° C. If MT is lower than −10° C., the logic goes to box S1030. If MT is not lower than −10° C., the logic goes to box S1050.

At box S1030, the processor sets an initial speed value of 8,000 rpm as the threshold Voff. Then, the logic goes to box S1040.

Immediately after engine start-up, it is predicted that the MT is equal to clutch operating temperature. Using the relationship In FIG. 13, the initial value of 8,000 rpm is simply set as threshold Voff at box S1030. More precisely, the initial value may be determined by retrieving FIG. 13. After box S1030, the logic goes to box S1040.

At box S1040, the processor monitors travel distance (TD) after engine start and waits until the TD becomes equal to or greater than a predetermined value α (alpha).

As the fully drawn line in FIG. 16 indicates, the clutch operating temperature Tc increases in proportional relationship with the TD because heat is generated within the clutch as the vehicle travels. Thus, this makes it possible to predict the clutch operating temperature from the TD.

The predetermined value α is determined by predicting a travel distance after which the clutch operating temperature will reach −10° C. Instead of the travel distance, the running time may be used.

At the next box S1050, the processor sets the value of 10,000 rpm as the threshold Voff.

According to the second implementation, one of two values, i.e., 8,000 rpm and 10,000 rpm, is selected as the threshold Voff. The MT (motor temperature) monitored immediately after the engine start is used as an initial value of clutch operating temperature. If MT is lower than −10° C., the value of 8,000 rpm is set as the threshold Voff. The TD (travel distance) monitored is used as a parameter indicative of clutch operating temperature. The clutch operating temperature is indicative of clutch drag state. The value of 10,000 rpm is set as the threshold Voff when the TD reaches the predetermined value α.

According to the second implementation, 4WD controller 8 monitors TD (travel distance) or running time of vehicle to account for a progress in clutch operating temperature Tc toward −10° C. as readily seen from a loop including box S1040 in FIG. 15 and the relationship illustrated in FIG. 16. When TD reaches the predetermined value α, 4WD controller S alters threshold Voff from 8,000 to 10,000. In other words, the vehicle can travel in 4WD mode until disengagement of wet clutch 12 upon the variable threshold Voff being exceeded by motor revolution speed.

According to the second implementation, monitoring a temperature sensor is no longer needed to account for clutch drag state because the travel distance or travel time is used.

Figure 17:
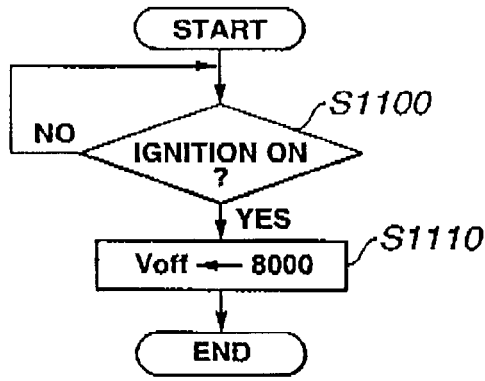
FIG. 17 is a flow diagram illustrating a threshold calculator sub-routine according to a third exemplary implementation of the present invention.
Figure 18:
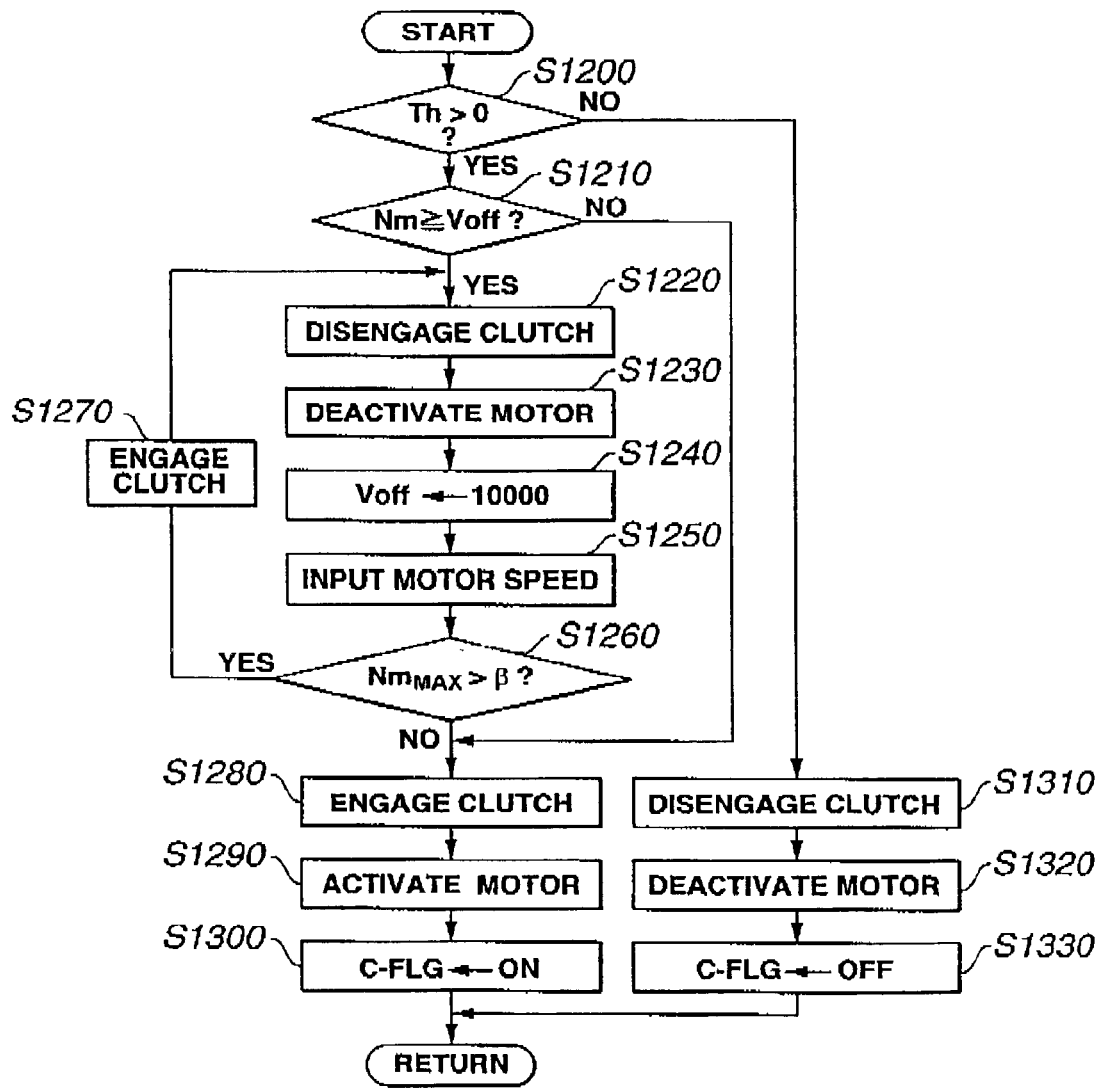
FIG. 18 is a flow diagram illustrating a clutch engagement/disengagement sub-routine according to the third implementation.

With reference now to FIGS. 17 and 18, there is provided a description on the third exemplary implementation of the present invention.

The third implementation is substantially the same as the first implementation except the contents of a threshold calculator sub-routine 8H and the content of a clutch engagement/disengagement sub-routine 8G. Like reference numerals and characters are used to designate like parts or portions throughout FIGS. 1 to 14, 17 and 18 for brevity of description of the third implementation.

The flow diagram in FIG. 17 illustrates the threshold calculator sub-routine 8H according to the third implementation of the present invention.

In FIG. 17, at box S1100, the processor waits until the ignition is turned on or the engine 2 starts. Upon or after the engine start-up, the control logic goes to box S1110.

At box S1110, the processor sets an initial value of 8,000 rpm as the threshold Voff. After box S1110, the routine ends.

The flow diagram in FIG. 18 illustrates the clutch engagement/disengagement sub-routine 8G according to the third implementation.

In FIG. 18, at enquiry box S1200, the processor determines whether or not the desired load torque Th is greater than 0 (zero). When Th is greater than 0, road wheels 1L and 1R are slipping, thus satisfying condition for operation in 4WD mode. In this case, the control logic goes to box S1210. When Tb is equal to or less than 0, road wheels 1L and 1R are not slipping, satisfying condition for operation in 2WD mode. In this case, the control logic goes to box S1310.

At box S1210, the processor determines whether or not a predetermined condition is satisfied to disengage clutch 12 by determining whether or not motor speed Nm is equal to or greater than threshold Voff. The processor determines that the condition to disengage clutch 12 is satisfied when motor speed Nm is equal to or greater than threshold Voff. In this case, the control logic goes to box S1220. When motor speed Nm is less than threshold Voff, the processor determines that the condition is not satisfied. In this case, the control logic goes to box S1280.

At box S1220, the processor outputs a clutch disengagement control signal to clutch controller block 8D (see FIG. 3) to disengage clutch 12. At the next box 1230, the processor outputs a relay OFF command to relay controller block 8B (see FIG. 3) to deactivate motor 4.

At the next box S1240, the processor sets another value of 10,000 rpm as threshold Voff. Then, the control logic goes to box S1250.

At box S1250, the processor monitors motor speed Nm for a predetermined period of time. At the next box S1260, the processor determines whether or not the maximum motor speed $Nm_{MAX}$ among the monitored motor speeds Nm is higher than a predetermined value of β. The predetermined value of β is 10,000 rpm, in this implementation. If $Nm_{MAX}$ is higher than 10,000 rpm, the control logic goes to box S1270. If $Nm_{MAX}$ is not higher than 10,000 rpm, the control logic goes to box S1280.

At box S1270, the processor output a clutch engagement command to clutch controller block 8D to engage wet clutch 12. The control logic goes back to box S1220. As illustrated, boxes S1279, S1220, S1230, S1240, S1250 and S1260 constitute a loop, and execution of this loop is repeated until $Nm_{MAX}$ drops to or below 10,000 rpm. According to the third implementation, the processor determines clutch drag state from the maximum motor speed $Nm_{MAX}$ immediately after disengagement of clutch 12 when supply of current to motor 4 is interrupted. With reference also to FIG. 13, it is readily seen that wet clutch 12 is in the clutch drag state above −10° C. when $Nm_{MAX}$ drops to 10,000 rpm. When $Nm_{MAX}$ drops to 10,000 rpm, the control logic goes to box S1280.

At box S1280, the processor outputs a clutch engagement command to clutch controller block 8D (see FIG. 3) to engage clutch 12. At the next box S1290, the processor outputs a relay ON signal to relay controller block 8B (see FIG. 3) to active motor 4. At the next box S1300, the processor sets flag C-FLG equal to ON level. After box S1300, the control logic returns to main routine in FIG. 4.

At box S1310, the processor outputs a clutch disengagement control signal to clutch controller block 8D (see FIG. 3) to disengage clutch 12. At the next box, S1320, the processor outputs a relay OFF signal to relay controller block 8B (see FIG. 3) to deactivate motor 4. At the next box S1330, the processor sets flag C-FLG equal to OFF level. After box S1330, the control logic returns to main routine in FIG. 4.

According to the third implementation, initially, a relatively low speed value of 8,000 rpm is set as threshold Voff. The motor 4 is held deactivated after disengagement of clutch 12 until the maximum motor revolution speed $Nm_{MAX}$ drops to 10,000 rpm. When $Nm_{MAX}$ drops to 10,000 rpm, the clutch 12 is engaged and the motor 4 is activated to provide 4WD mode. Subsequently, the clutch disengagement is repeated with 10,000 rpm as threshold Voff. In this example, execution of a loop constituted by boxes S1279, S1220, S1230, S1240, S1250 and S1260 is repeated whenever it is determined, at box S1210, that Nm is equal to or higher than threshold Voff. The execution of such loop may be eliminated after $Nm_{MAX}$ has dropped, at box S1260, down to 10,000 rpm.

According to the third implementation, 4WD controller 8 monitors a motor speed sensor 26 (see FIG. 2) to account for a change in motor speed Nm immediately after disengagement of wet clutch 12 when supply of current to motor 4 is interrupted, thereby to monitor the clutch drag state.

According to the third implementation, monitoring a temperature sensor is no longer needed to account for clutch drag state because the maximum motor speed $Nm_{MAX}$ is monitored.

Figure 19:
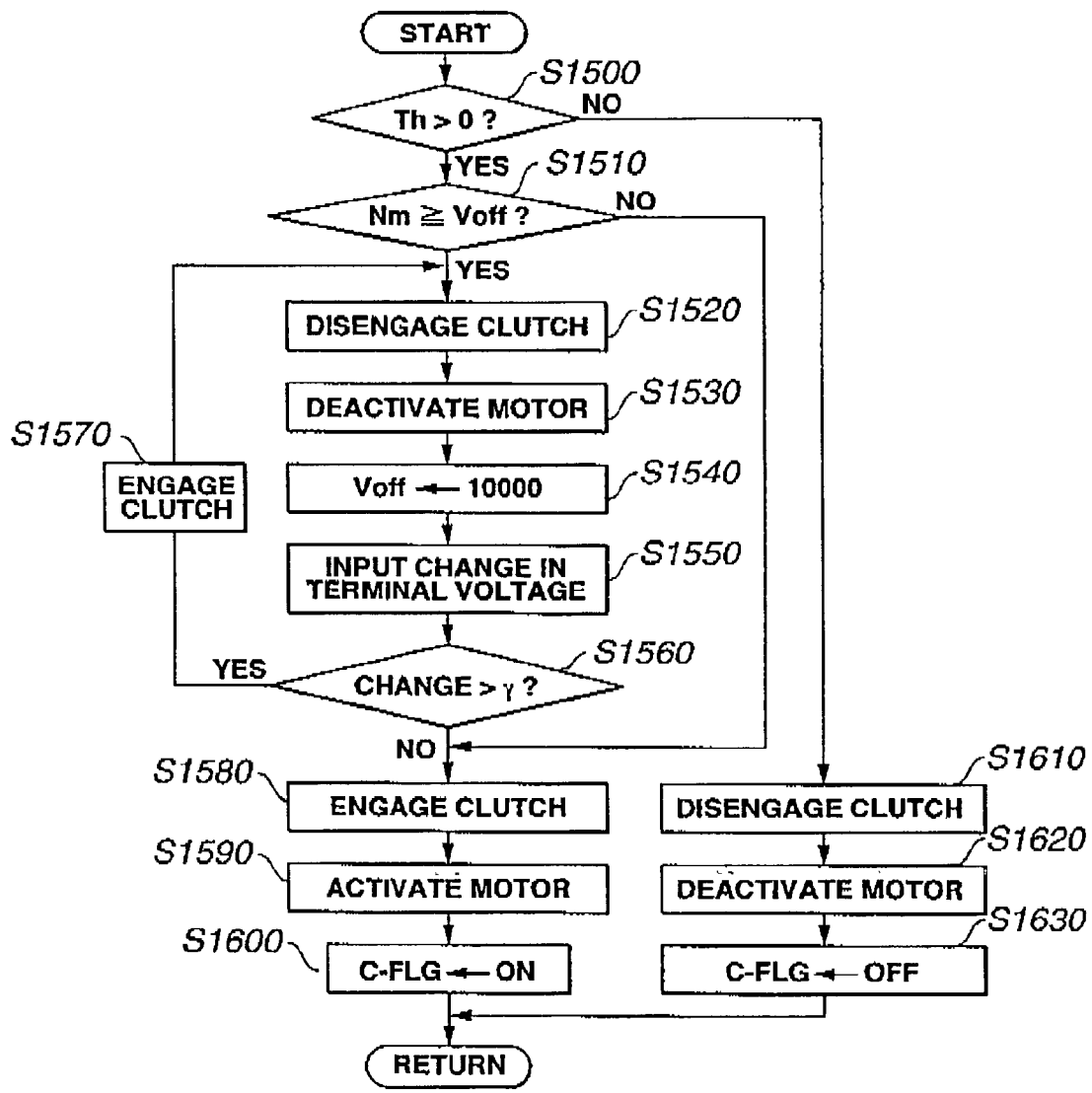
FIG. 19 is a flow diagram illustrating a clutch engagement/disengagement sub-routine according to a fourth exemplary implementation of the present invention.

With reference now to FIG. 19, there is provided a description on the fourth exemplary implementation of the present invention.

The fourth implementation is substantially the same as the third implementation. However, the content of a clutch engagement/disengagement sub-routine 8G of the fourth implementation is different from that of the third implementation. Like reference numerals and characters are used to designate like parts or portions throughout FIGS. 1 to 14, 17–18 and 19 for brevity of description of the fourth implementation.

The flow diagram in FIG. 19 illustrates the clutch engagement/disengagement sub-routine 8G according to the fourth implementation. The flow diagram in FIG. 19 is substantially the same as the flow diagram in FIG. 18. For example, boxes S1500, S1610, S1620 and S1630 correspond to S1200, S1310, S1320 and S1330, respectively. Boxes S1510, S1580, S1590 and S1600 correspond to boxes S1210, S1280, S1290 and S1300, respectively. Boxes S1520, S1530, S1540 and S1570 correspond to boxes S1220, S1230, S1240 and S1270, respectively. The flow diagram in FIG. 19 is different from the flow diagram in FIG. 18 in that a change in terminal voltage of motor 4 after disengagement of clutch is monitored at boxes S1550 and S1560 according to the fourth implementation, while the maximum motor revolution speed $Nm_{MAX}$ is monitored at boxes S1250 and S1260 according to the third implementation.

In FIG. 19, at box S1550, the processor monitors a change in terminal voltage E of motor 4 due to counter electromotive force immediately after disengagement of wet clutch 12 (at box S1520) when, supply of current to motor 4 is interrupted to deactivate motor 4 (at box S1530). After box S1550, the control logic goes to box S1560.

At box S1560, the processor determines whether the change in terminal voltage E is greater than a predetermined value γ. The processor determines that clutch drag is greater than a predetermined level when the change in terminal voltage E is greater than the predetermined value γ. In this case, the control logic goes to box S1570. The processor determines that clutch drag is not greater than the predetermined level when the change in terminal voltage E is not greater than the predetermined value γ. In this case, the control logic does to box S1580.

According to the fourth implementation, 4WD controller 8 monitors terminal voltage E of motor 4 to account for a change in terminal voltage E of motor 4 due to counter electromotive force immediately after disengagement of wet clutch 12 when supply of current to motor 4 is interrupted to deactivate motor 4.

According to the fourth implementation, monitoring a temperature sensor is no longer needed to account for clutch drag state because the change in inverse induction voltage of motor is monitored.

Figure 20:
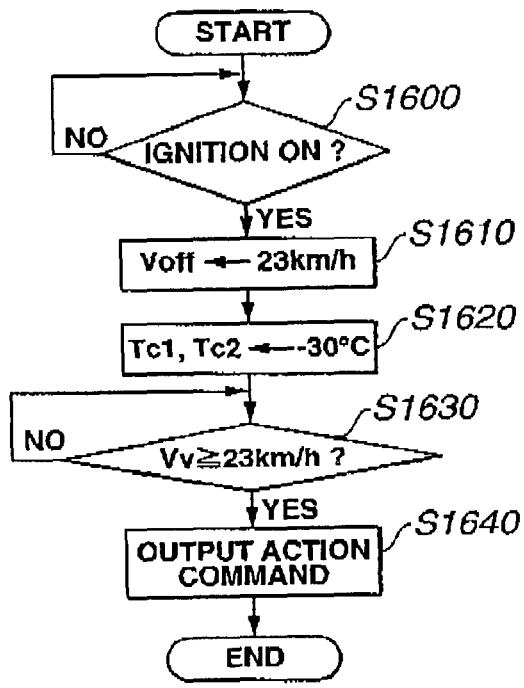
FIG. 20 is a flow diagram illustrating an initial value set portion of a threshold calculator sub-routine according to a fifth exemplary implementation of the present invention.
Figure 21:
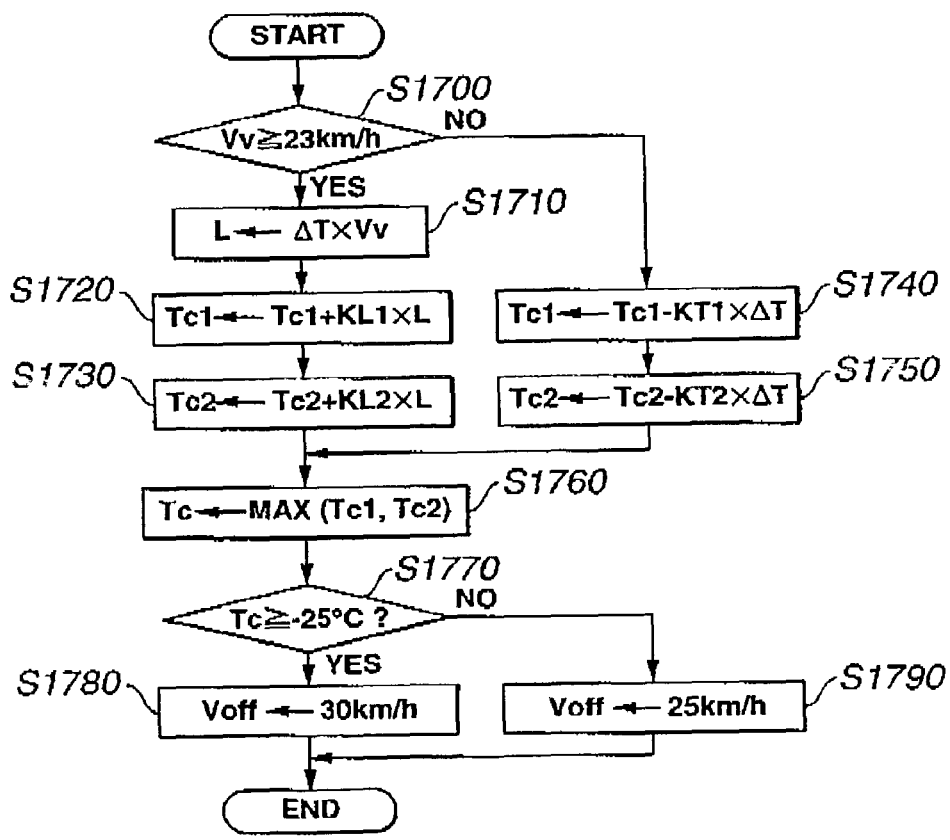
FIG. 21 is a flow diagram illustrating a main portion of the threshold calculator sub-routine according to the fifth implementation.

With reference now to FIGS. 20 and 21, there is provided a description on the fifth exemplary implementation of the present invention.

The fifth implementation is substantially the same as the first implementation. Like reference numerals and characters are used to designate like parts or portions throughout FIGS. 1 to 14, 20 and 21 for brevity of description of the third implementation.

The flow diagram in FIG. 20 illustrates an initial value setting portion of the threshold calculator sub-routine 8H, and the flow diagram in FIG. 21 illustrates a main portion of the threshold calculator sub-routine 8H. The fifth implementation is different from the first implementation in that, in the fifth implementation, the actual vehicle speed is compared to threshold Voff, while, in the first implementation, the motor revolution speed, which is indicative of the actual vehicle speed, is compared to threshold Voff Another difference resides in the content of the threshold calculator sub-routine 8H. In the first implementation, the threshold sub-routine illustrated in FIG. 8 is used, while, in the fifth implementation, the threshold sub-routine illustrated in FIGS. 20 and 21 is used.

In FIG. 20, at box S1600, the processor waits until the ignition is turned on or the engine 2 starts. Upon or after the engine start-up, the control logic goes to box S1610. At box S1610, the processor initializes threshold Voff with an initial vehicle speed value of 23 km/h, in this implementation. At the next box S1620, the processor initializes a local clutch operating temperature Tc1 in the proximity of clutch plates of wet clutch 12 and an overall clutch operating temperature Tc2 of wet clutch 12 with an initial temperature value of −30° C.

At the next box S1630, the processor waits until am instantaneous value Vv indicative of the actual vehicle speed becomes equal to or higher than a vehicle speed of 23 km/h. When the actual vehicle speed indicative instantaneous value Vv reaches 23 km/h, the processor outputs an action command signal at box S1640. After box S1640, the routine ends.

Execution of the flow diagram in FIG. 21 is initiated by the action command signal.

In FIG. 21, at box S1700, the processor determines whether or not the actual vehicle speed indicative instantaneous value Vv is equal to or higher than 23 km/h. If Vv is equal to or higher than 23 km/h, the control logic goes to box S1710. If Vv is lower than 23 km/h, the control logic goes to box S1740.

In this implementation, the vehicle speed of 23 km/h is a predetermined vehicle speed value, which is used, as criterion, in calculating an increment in clutch oil temperature or a decrement in clutch oil temperature. This predetermined vehicle speed value is determined based on a revolution speed transferred to the clutch 12 from road wheels 3R and 3L and on oil property.

At box S1710, the processor calculates a travel distance L during a sampling time $\Delta T$. The travel distance L is expressed as, $$L = \Delta T \times Vv \qquad \text{Eq. 8}$$

where:
$\Delta T$: Sampling time; and
Vv: Instantaneous value indicative of the actual vehicle speed.

In this implementation, travel distance L for the sampling time. One may calculates a travel distance for extended period of time, if desired.

At the next box S1720, the processor increments Tc1 that is expressed as, $$Tc1 = Tc1 + KL1 \times L \qquad \text{Eq. 9}$$

where:
Tc1: Local temperature in the proximity of clutch plates of wet clutch 12;
L: Travel distance during sampling time $\Delta T$; and
KL1: Distance gain reflecting an oil temperature increase rate in the proximity of the clutch plates of the wet clutch 12.

At the next box S1730, the processor increments Tc2 that is expressed as, $$Tc2 = Tc2 + KL2 \times L \qquad \text{Eq. 10}$$

where:
Tc2: Overall temperature of wet clutch 12;
L: Travel distance during sampling time $\Delta T$; and
KL2: Distance gain reflecting an oil temperature increase rate of all of the oil within the wet clutch 12.

The setting is such that KL1>KL2 because the gradient of oil temperature increase in the proximity of the clutch plates is great.

If, at box S1700, Vv is lower than 23 km/h, the control logic goes to box S1740.

At box S1740, the processor decrements Tc1 that is expressed as, $$Tc1 = Tc1 - KT1 \times \Delta T \qquad \text{Eq. 11}$$

where:
Tc1: Local temperature in the proximity of clutch plates of wet clutch 12;
KT1: Time gain reflecting an oil temperature drop rate in the proximity of the clutch plates of the wet clutch 12; and
$\Delta T$: Sampling time.

At the next box S1750, the processor decrements Tc2 that is expressed as, $$Tc2 = Tc2 - KT2 \times \Delta T \qquad \text{Eq. 12}$$

where:
Tc2: Overall temperature of wet clutch 12;
KT2: Time gain reflecting an oil temperature drop rate of all of the oil within the wet clutch 12; and
$\Delta T$: Sampling time.

The setting is such that KT1>KT2 because the temperature drop of all of the oil may be neglected once the vehicle start running. Thus, the gain KT2 may be set zero, and the box S1750 may be eliminated.

At box S1760, the processor selects greater one or higher one of Tc1 and Tc2 and set the result as a clutch operating temperature Tc.

At the next box S1770, the processor determines whether or not Tc is equal to or higher than −25° C. If this is the case, the control logic goes to box S1780. If this is not the case, the control logic goes to box S1790.

At box S1780, the processor sets 30 km/h as threshold Voff. At box S1790, the processor sets 25 km/h as threshold Voff. After box S1780 or S1790, the control logic returns to main routine in FIG. 4.

According to the implementations of the present invention, a vehicle includes a wet clutch. The wet clutch is provided to transmit torque output of a traction motor to road wheels and to transmit load road from the road wheels to the motor. The vehicle operates in 4WD mode by engagement of the clutch when demanded to cope with varying road surface conditions, including snowy road surface. The vehicle operates in 4WD mode till disengagement of the clutch when threshold Voff is attained. Out of various values, one value is selected and set as the threshold Voff accounting for predicted clutch drag state. Predicting the clutch drag state is needed to provide extended operating range of the motor and thus extended operating range of 4WD mode toward high vehicle speed and protection to the motor as well.

In the fifth implementation, a parameter indicative of the actual vehicle speed is compared to the threshold (vehicle speed value $V_0$).

As mentioned above, the threshold varies accounting for predicted clutch drag state. What indicates the clutch drag state is clutch operating temperature Tc. According to the implementations, the clutch operating temperature is predicted for use in selecting one out of various values as the threshold.

According to the fifth implementation, without monitoring a temperature sensor, the clutch operating temperature is predicted based on travel distance and running time of the vehicle. The clutch operating temperature is a local temperature in the proximity of clutch plates. This implementation does not require the provision of a temperature sensor to predict the local temperature in the proximity of clutch plates Operating speed of the clutch influences the clutch operating temperature. The clutch operating temperature is elevated during operation at speeds higher than or equal to a predetermined speed value that may be determined by a speed value, for example, 23 km/h in this example. According to the fifth implementation, integrating travel time during which the HEV operates at speeds higher than or equal to the vehicle speed value of 23 km/h enhances the accuracy of prediction of elevation of the clutch temperature.

Prediction requires an initial temperature value of the clutch operating temperature (clutch oil temperature). In the fifth implementation, a fixed value of −30° C. is set as such initial temperature value. The present invention is not limited to this. The motor temperature immediately after engine start, for example, may be used to predict such initial temperature value. Such predicted value, which is not a fixed value, may be set as the initial temperature value.

As mentioned before, operating speed of the clutch influences operating temperature thereof. No contribution is seen to the elevation of clutch operating temperature during operation at speeds lower than the predetermined speed value that may be determined by the vehicle speed value of 23 km/h. Under this condition, the clutch operating temperature drops at a certain rate. Such rate is determined to lower the predicted clutch operating temperature. The initial value of 23 km/h is set as the threshold Voff when the predicted clutch operating temperature drops down to or below a predetermined temperature value.

Theoretically, a prediction of the local temperature Tc1 suffices in selecting one out of various values to be set as threshold Voff. However, sometimes such prediction is lower than a measure of the local temperature Tc1 in the proximity of clutch plates due to integration error. For example, a prediction is lower than −25° C. when a measure is not lower than −25° C., setting, as threshold, a value lower than expected. According to the implementation, a greater one of a prediction of the overall temperature of clutch Tc2 and a prediction of the local temperature Tc1 in the proximity of clutch plates is used as a clutch oil temperature Tc, thus preventing the tendency of setting, as threshold, a value lower than expected.

Distance and time gains KL2 and KT2 are used in predicting the overall operating temperature Tc2, while distance and time gains KL1 and KT1 are used in predicting the local temperature Tc1 in the proximity of clutch plates. The gains KL2 and KT2 are less great than the gains KL1 and KT1, respectively. This means that integration error in predicting the overall operating temperature Tc2 is smaller than that in predicting the local temperature Tc1. Thus, the prediction of the overall operating temperature Tc2 serves as a reliable indicator as to what is in progress within the clutch when the prediction of the local temperature Tc1 deviates due to integration error.

It can be assumed that the actual temperature within the clutch will be elevated as high as or higher than −25° C. by the time the vehicle will have traveled over a predetermined distance. In this case, the value of the threshold Voff may be kept at 30 km/h upon or immediately after the overall operating temperature of clutch Tc2 has become as high as or higher than −25° C.

The timing diagram illustrated in FIG. 22 shows the gradual increasing of the prediction of the overall operating temperature Tc2 versus pulsating movement of the prediction of the local temperature Tc1. In the timing diagram, the reference character X indicates a situation where the prediction of the local temperature Tc1 drops below −25° C. due to integrating error. It is appreciated that, even if the prediction of the local temperature Tc1 drops below −25° C., the vehicle speed threshold Voff is maintained at 30 km/h because the prediction of the overall operating temperature Tc2 is as high as or higher than −25° C.

In the fifth implementation, the prediction of the overall temperature Tc2 is used in addition to the prediction of the local temperature Tc1. The present invention is not limited to this. The prediction of the local temperature Tc1 only may be used as the oil temperature Tc in selecting one out of various values as the threshold Voff.

In the implementations, the two-level threshold Voff is used. The present invention is not limited to the use of such two-level threshold. A multiple-level threshold more than two levels may be used.

In the fifth implementation, the local temperature Tc1 in the proximity of clutch plates and the overall temperature Tc2 are both predicted based on travel distance and running time. The present invention is not limited to the use of a prediction of the overall temperature. Instead of predicting the overall temperature Tc2, a measure of the overall temperature Tc2 may be used by monitoring a temperature sensor. In this case, the provision of such temperature sensor is needed. The installation of such temperature sensor is less difficult than the installation of a temperature sensor to measure local temperature Tc1 in the proximity of clutch plates.

In the implementation, the same value (=23 km/h) is used as a first predetermined speed value and a second predetermined speed value. When an instantaneous value Vv indicative of the actual vehicle is higher than or equal to the first predetermined speed value, the revolution speed of the clutch is high enough to cause an increase in the clutch operating temperature. When the instantaneous value Vv indicative of the actual vehicle speed is lower than the second predetermined speed value, the revolution speed of the clutch is low, allowing a drop in the clutch operating temperature. The present invention is not limited to this. Different values may be set as the first and second predetermined speed values. For example, an upper value of 23 km/h is set as the first predetermined speed value and a lower value of 15 km/h is set as the second predetermined speed value. In this case, the clutch operating temperature begins increasing upon or after the upper value of 23 km/h is reached or exceeded, and the clutch operating temperature begins decreasing when the actual vehicle speed drops below the lower value of 15 km/h.

From the previous description of the implementations of the present invention, it will be understood that the present invention provides a method for providing extended operating range of motor 4 as well as providing protection to the motor. Such method comprises accounting for a progress in a physical quantity that increases from an initial value immediately after activation of the vehicle, and altering, in response to the progress accounted for, a value of a parameter indicative of the physical quantity. The method also comprises selecting, in response to the parameter, one out of various values as threshold; determining that the wet clutch be disengaged when a parameter indicative of the actual vehicle speed has a predetermined relationship with the threshold; and generating the clutch disengagement control signal upon determining that the wet clutch be disengaged. One example of the physical quantity is clutch operating temperature Tc of wet clutch 12. Another example of the physical quantity is local temperature Tc1 in the proximity of wet clutch 12. Still another example of the physical quantity is travel distance of vehicle. Other example of the physical quantity is running time of vehicle.

While the present invention has been particularly described, in conjunction with exemplary implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-274123, filed Sep. 10, 2001, and No. P2001-367541, filed Nov. 30, 2001, the disclosure of each of which is hereby incorporated by reference in its entirety.

What is claimed is:

1. An apparatus in a vehicle, the apparatus comprising:
   a motor;
   a wet clutch for transmission of torque output of the motor to road wheels of the vehicle and transmission of road load from the road wheels to the motor, the wet clutch being disengaged in response to a clutch disengagement control signal; and
   a controller,
   the controller determining that the wet clutch be disengaged when a parameter indicative of the actual vehicle speed has a predetermined relationship with a threshold,
   the controller generating the clutch disengagement control signal upon determining that the wet clutch be disengaged, and
   the controller altering the threshold by accounting for a clutch drag state upon and immediately after disengagement of the wet clutch.

2. The apparatus as claimed in claim 1, wherein the controller selects one out of various values as the threshold in altering the threshold, such that the value of the threshold is less, when the clutch drag state of the wet clutch is great, than the value of the threshold when the clutch drag state of the wet clutch is less great.

3. The apparatus as claimed in claim 1, wherein the controller monitors a temperature sensor within the wet clutch to monitor the clutch drag state of the wet clutch.

4. The apparatus as claimed in claim 1, wherein, to monitor the clutch drag state of the wet clutch, the controller monitors a revolution speed sensor of the motor to account for a change in revolution speed of the motor immediately after disengagement of the wet clutch when supply of current to the motor is interrupted to deactivate the motor.

5. The apparatus as claimed in claim 1, wherein, to monitor the clutch drag state of the wet clutch, the controller monitors terminal voltage of the motor to account for a change in terminal voltage of the motor due to counter electromotive force immediately after disengagement of the wet clutch when supply of current to the motor is interrupted to deactivate the motor.

6. The apparatus as claimed in claim 1, wherein the controller monitors at least one of travel distance and running time of the vehicle to account for a progress and alters, in response to the progress, a value of a parameter indicative of clutch drag state of the wet clutch.

7. The apparatus as claimed in claim 6, further comprising:
   a first set of road wheels;
   a second set of road wheels;
   a prime mover drivingly coupled to the first set of road wheels;
   wherein the wet clutch is positioned between the motor and the second set of road wheels for transmission of torque output of the motor to the second set of road wheels and transmission of road load from the second set of road wheels to the motor;
   wherein the controller monitors temperature of the motor upon start-up of the prime mover for each drive cycle of the vehicle and sets the monitored temperature as an initial temperature value, and wherein the controller selects one out of the various values as an initial value of the threshold in response to the initial temperature value.

8. The apparatus as claimed in claim 6, wherein the controller monitors the progress by accounting for travel distance over which the vehicle has traveled at speeds higher than a predetermined speed value to increase the value of clutch drag state indicative parameter.

9. The apparatus as claimed in claim 8, wherein the controller accounts for running time during which the vehicle has traveled at speeds lower than a second predetermined speed value for the controller to decrease the value of the clutch drag state indicative parameter.

10. The apparatus as claimed in claim 1, wherein the controller accounts for travel distance over which the vehicle has traveled at speeds higher than a first predetermined speed value and running time during which the vehicle has traveled at speeds lower than a second predetermined speed value,
    wherein the controller predicts a local temperature in the proximity of clutch plates of the wet clutch based on the travel distance and the running time,
    wherein the controller predicts an overall temperature of the wet clutch based on the travel distance and the running time, and
    wherein the controller selects a greater one of the local and overall temperatures predicted as a parameter indicative of clutch drag state of the wet clutch in altering the threshold.

11. The apparatus as claimed in claim 1, wherein the controller monitors a revolution speed sensor of the motor as the parameter indicative of the actual vehicle speed.

12. The apparatus as claimed in claim 1, wherein the threshold varies to extend operating range of the motor while protecting the motor from excessive rotation.

13. A method for providing extended operating range of a motor of a vehicle as well as providing protection to the motor, the vehicle including a wet clutch for transmission of torque output of the motor to road wheels of the vehicle and transmission of load from the road wheels to the motor, the wet clutch being disengaged in response to a clutch disengagement control signal, the method comprising:
    determining that the wet clutch be disengaged when a parameter indicative of the actual vehicle speed has a predetermined relationship with a threshold;
    generating the clutch disengagement control signal upon determining that the wet clutch be disengaged; and
    altering the threshold by accounting for a clutch drag state upon and immediately after disengagement of the wet clutch.

14. A method for providing extended operating range of a motor of a vehicle as well as providing protection to the motor, the vehicle including a wet clutch for transmission of torque output of the motor to road wheels of the vehicle and transmission of load from the road wheels to the motor, the wet clutch being disengaged in response to a clutch disengagement control signal, the method comprising:
    predicting a local temperature in the proximity of clutch plates of the wet clutch;

determining an overall temperature of the wet clutch;
determining, based on the local temperature and the overall temperature, a clutch operating temperature;
selecting one out of various values as threshold when the clutch operating temperature is higher than or equal to a first predetermined temperature value;
selecting another out of the various values as the threshold when the clutch operating temperature is lower than a second predetermined temperature value;
determining that the wet clutch be disengaged when a parameter indicative of the actual vehicle speed has a predetermined relationship with the threshold; and
generating the clutch disengagement control signal upon determining that the wet clutch be disengaged.

15. The method as claimed in claim 14, further comprising monitoring a temperature sensor to determine the overall temperature.

16. The method as claimed in claim 14, wherein predicting a local temperature includes comparing an instantaneous value indicative of the actual vehicle speed to a predetermined speed value; calculating a travel distance by multiplying the instantaneous value with a sampling time when the instantaneous value is higher than or equal to the predetermined speed value; calculating an increment by multiplying the travel distance with a distance gain; calculating a decrement by multiplying the sampling time with a time gain when the instantaneous value is lower than the predetermined speed value; incrementing the local temperature with the increment when the instantaneous value is higher than or equal to the predetermined speed value; and decrementing the local temperature with the decrement when the instantaneous value is lower than the predetermined speed value.

17. The method as claimed in claim 16, wherein determining an overall temperature includes calculating a second increment by multiplying the travel distance with a second distance gain when the instantaneous value is higher than or equal to the predetermined speed value; calculating a second decrement by multiplying the sampling time with a second time gain when the instantaneous value is lower than the predetermined speed value; incrementing the overall temperature with the second increment when the instantaneous value is higher than or equal to the predetermined speed value; and decrementing the overall temperature with the second decrement when the instantaneous value is lower than the predetermined speed value.

18. The method as claimed in claim 17, wherein the first mentioned distance gain is greater than the second distance gain, and the first mentioned time gain is greater than the second time gain.

19. The method as claimed in claim 14, wherein the second predetermined temperature value is equal to the first predetermined temperature value.

20. The method as claimed in claim 14, wherein the second predetermined temperature value is lower than the first predetermined temperature value.

21. The method as claimed in claim 14, wherein determining a clutch operating temperature includes selecting a higher one of the local temperature and the overall temperature as the clutch operating temperature.

22. The method as claimed in claim 14, wherein the clutch operating temperature is a parameter indicative of clutch drag state of the wet clutch.

23. The method as claimed in claim 17, further comprising monitoring a temperature sensor of the motor to predict initial values of the local and overall temperatures.

24. An apparatus for providing extended operating range of a motor of a vehicle as well as providing protection to the motor, the vehicle including a wet clutch for transmission of torque output of the motor to road wheels of the vehicle and transmission of load from the road wheels to the motor, the wet clutch being disengaged in response to a clutch disengagement control signal, the apparatus comprising:
means for determining that the wet clutch be disengaged when a parameter indicative of the actual vehicle speed has a predetermined relationship with a threshold;
means for generating the clutch disengagement control signal upon determining that the wet clutch be disengaged; and
means for altering the threshold by accounting for the clutch drag state upon and immediately after disengagement of the wet clutch.

25. The apparatus as claimed in claim 6, wherein the clutch drag state indicative parameter indicates a clutch operating temperature of the wet clutch.

26. The apparatus as claimed in claim 25, wherein the controller monitors the travel distance by accounting for a distance over which the vehicle has traveled at speed not lower than a predetermined vehicle speed value during a sampling time.

27. The apparatus as claimed in claim 26, wherein the controller monitors the running time by accounting for the sampling time during which the vehicle has traveled at speed lower than the predetermined vehicle speed value.

28. The apparatus as claimed in claim 26, wherein the controller monitors the progress by accounting for an increment expressed as the product of a distance gain and the travel distance.

29. The apparatus as claimed in claim 28, wherein the controller increases the value of the clutch drag state indicative parameter by the increment.

30. The apparatus as claimed in claim 29, wherein the controller monitors the progress by accounting for a decrement expressed as the product of a time gain and the running time.

31. The apparatus as claimed in claim 30, wherein the controller decreases the value of the clutch drag state indicative parameter by the decrement.

32. The apparatus as claimed in claim 6, wherein the controller alters the threshold by comparing the clutch drag state indicative parameter to a predetermined value, selecting one out of various values as the threshold when the clutch drag state indicative parameter is lower than the predetermined value and selecting another out of the various values as the threshold when the clutch drag state indicative parameter is not lower than the predetermined value.

33. An apparatus in a vehicle comprising:
a motor;
a wet clutch for transmission of torque output of the motor to road wheels of the vehicle and transmission of road load from the road wheels to the motor, the wet clutch being disengaged in response to a clutch disengagement control signal; and
a controller,
the controller determining that the wet clutch be disengaged when a parameter indicative of the actual vehicle speed has a predetermined relationship with a threshold,
the controller generating the clutch disengagement control signal upon determining that the wet clutch be disengaged,
the controller accounting for clutch drag state of the wet clutch, and the controller, in response to the clutch drag state accounted for, altering the threshold.

34. The apparatus as claimed in claim 33, wherein, to account for clutch drag state of the wet clutch, the controller monitors a temperature sensor within the wet clutch.

35. The apparatus as claimed in claim 33, wherein, to account for the clutch drag state of the wet clutch, the controller monitors a revolution speed sensor of the motor to account for a change in revolution speed of the motor immediately after disengagement of the wet clutch when supply of current to the motor is interrupted to deactivate the motor.

36. The apparatus as claimed in claim 33, wherein, to account for clutch drag state of the wet clutch, the controller monitors terminal voltage of the motor to account for a change in terminal voltage of the motor due to counter electromotive force immediately after disengagement of the wet clutch when supply of current to the motor is interrupted to deactivate the motor.

37. A method for providing extended operating range of a motor of a vehicle as well as providing protection to the motor, the vehicle including a wet clutch for transmission of torque output of the motor to road wheels of the vehicle and transmission of load from the road wheels to the motor, the wet clutch being disengaged in response to a clutch disengagement control signal, the method comprising:
  determining that the wet clutch be disengaged when a parameter indicative of the actual vehicle speed has a predetermined relationship with a threshold;
  generating the clutch disengagement control signal upon determining that the wet clutch be disengaged;
  accounting for clutch drag state of the wet clutch; and
  altering the threshold in response to the clutch drag state accounted for.

38. A method for providing extended operating range of an electric traction motor of a vehicle as well as providing protection to the electric traction motor, the vehicle including a wet clutch for transmission of torque output of the electric traction motor to road wheels of the vehicle and transmission of load from the road wheels to the electric traction motor, the wet clutch being disengaged in response to a clutch disengagement control signal, the method comprising:
  accounting for a progress in a physical quantity that increases from an initial value immediately after activation of the vehicle with the wet clutch completely engaged;
  altering, in response to the progress accounted for, a value of a parameter indicative of the physical quantity;
  selecting, in response to the parameter, one out of various values as a threshold;
  determining that the wet clutch be disengaged when a parameter indicative of the actual vehicle speed has increased to the threshold; and
  generating the clutch disengagement control signal upon determining that the wet clutch be disengaged and thereby disengaging the electric traction motor from the road wheels to interrupt transmission of torque output of the electric traction motor to the road wheels of the vehicle and transmission of load from the road wheels to the electric traction motor,
  wherein the physical quantity is a clutch operating temperature of the wet clutch.

39. A method for providing extended operating range of an electric traction motor of a vehicle as well as providing protection to the electric traction motor, the vehicle including a wet clutch for transmission of torque output of the electric traction motor to road wheels of the vehicle and transmission of load from the road wheels to the electric traction motor, the wet clutch being disengaged in response to a clutch disengagement control signal, the method comprising:
  accounting for a progress in a physical quantity that increases from an initial value immediately after activation of the vehicle with the wet clutch completely engaged;
  altering, in response to the progress accounted for, a value of a parameter indicative of the physical quantity;
  selecting, in response to the parameter, one out of various values as a threshold;
  determining that the wet clutch be disengaged when a parameter indicative of the actual vehicle speed has increased to the threshold; and
  generating the clutch disengagement control signal upon determining that the wet clutch be disengaged and thereby disengaging the electric traction motor from the road wheels to interrupt transmission of torque output of the electric traction motor to the road wheels of the vehicle and transmission of load from the road wheels to the electric traction motor,
  wherein the physical quantity is a local temperature in the proximity of the wet clutch.

40. A vehicle comprising:
  a first set of road wheels;
  a second set of road wheels;
  a prime mover drivingly coupled to the first set of road wheels;
  a source of electric power;
  a motor selectively connected to the source of electric power to produce torque output;
  a wet clutch between the motor and the second set of road wheels for transmission of torque output of the motor to the second set of road wheels and transmission of road load from the second set of road wheels to the motor, the wet clutch being disengaged in response to a clutch disengaged control signal; and
  a controller,
    the controller, accounting for clutch drag state of the wet clutch, selecting one out of various values as a threshold,
    the controller determining that the wet clutch be disengaged when a parameter indicative of the actual vehicle speed has a predetermined relationship with the threshold,
    the controller generating the clutch disengagement control signal upon determining that the wet clutch be disengaged.

41. The vehicle as claimed in claim 40, wherein the source of electric power is a generator drivingly coupled to the prime mover.

* * * * *